US009732175B2

(12) United States Patent
Lin et al.

(10) Patent No.: US 9,732,175 B2
(45) Date of Patent: Aug. 15, 2017

(54) CERAMIC-POLYMER NANOCOMPOSITES

(71) Applicant: NANYANG TECHNOLOGICAL UNIVERSITY, Singapore (SG)

(72) Inventors: Meng-Fang Lin, Singapore (SG); Pooi See Lee, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 14/889,791

(22) PCT Filed: May 7, 2014

(86) PCT No.: PCT/SG2014/000199
§ 371 (c)(1),
(2) Date: Nov. 6, 2015

(87) PCT Pub. No.: WO2014/182245
PCT Pub. Date: Nov. 13, 2014

(65) Prior Publication Data
US 2016/0090433 A1 Mar. 31, 2016

Related U.S. Application Data

(60) Provisional application No. 61/820,375, filed on May 7, 2013.

(51) Int. Cl.
| | | |
|---|---|---|
| C08F 2/46 | (2006.01) | |
| C08G 61/04 | (2006.01) | |
| C08F 259/08 | (2006.01) | |
| B82Y 30/00 | (2011.01) | |
| C08K 3/22 | (2006.01) | |
| C08G 61/12 | (2006.01) | |
| C08K 3/00 | (2006.01) | |
| C08K 3/24 | (2006.01) | |
| H01B 3/12 | (2006.01) | |

(52) U.S. Cl.
CPC ............ *C08F 259/08* (2013.01); *B82Y 30/00* (2013.01); *C08G 61/124* (2013.01); *C08K 3/0033* (2013.01); *C08K 3/22* (2013.01); *C08K 3/24* (2013.01); *C08K 2201/011* (2013.01); *H01B 3/12* (2013.01)

(58) Field of Classification Search
CPC .... C08F 259/08; C08F 220/20; C08G 61/124; C08K 3/22; C08K 2201/011; C08L 27/16; B82Y 30/00; H01B 3/12
USPC .... 522/156, 155, 150, 161, 1, 157; 525/303, 525/326.2, 362, 302, 298, 242, 55, 50, 525/326.1, 361, 360; 520/1
See application file for complete search history.

(56) References Cited

U.S. PATENT DOCUMENTS

2006/0004147 A1 1/2006 Park et al.
2013/0022752 A1 1/2013 Antonakas

FOREIGN PATENT DOCUMENTS

DE 10 2008 045 982 A1 3/2010

OTHER PUBLICATIONS

Lee et al, Flexible high Performance capacitors for portable power systems, Mar. 25, 2012, Prep. Pap.-Am. Chem. Soc.,Div. Fuel Chem., 57(1), pp. 850-851.*
Dargaville et al, High energy radiation grafting of fluoropolymers, 2003, Prog. Polym. Sci., 28, pp. 1355-1376.*
Arbatti et al., "Ceramic-Polymer Composites with High Dielectric Constant," *Advanced Materials* 19(10):1369-1372, 2007.
Awanis Hashim et al., "Stability of PVDF hollow fibre membranes in sodium hydroxide aqueous solution," *Chemical Engineering Science* 66(8):1565-1575, 2011.
Badheka et al., "Effect of Dehydroxylation of Hydrothermal Barium Titanate on Dielectric Properties in Polystyrene Composite," *Journal of Applied Polymer Science* 99(5):2815-2821, 2006.
Bai et al., "High-dielectric-constant ceramic-powder polymer composites," *Applied Physics Letters* 76(25):3804-3806, 2000.
Berthelot et al., "Photoactivated surface grafting from PVDF surfaces," *Applied Surface Science* 257(22):9473-9479, 2011.
Chu et al., "A Dielectric Polymer with High Electric Energy Density and Fast Discharge Speed," *Science* 313(5785):334-336, 2006.
Dang et al., "Dielectric behavior of Li and Ti co-doped NiO/PVDF composites," *Chemical Physics Letters* 376(3):389-394, 2003.
Dang et al., "Morphology and Dielectric Property of Homogenous BATiO$_3$/PVDF Nanocomposites Prepared via the Natural Adsorption Action of Nanosized BaTiO$_3$," *Macromolecular Rapid Communications* 26(14):1185-1189, 2005.
Dargaville et al., "High energy radiation grafting of fluoropolymers," *Progress in Polymer Science* 28(9):1355-1376, 2003.
Ginzburg et al., "High-Dielectric-Constant Self-Assembled Nodular Structures in Polymer/Gold Nanoparticle Films," *Macromolecules* 39(11):3901-3906, 2006.
Guo et al., "Nanoparticle, Size, Shape, and Interfacial Effects on Leakage Current Density, Permittivity, and Breakdown Strength of Metal Oxide-Polyolefin Nanocomposites: Experiment and Theory," *Chemistry of Materials* 22(4):1567-1578, 2010.
Guo et al., "Supported Metallocene Catalysis for in Situ Synthesis of High Energy Density Metal Oxide Nanocomposites," *Journal of the American Chemical Society* 129(4):766-767, 2007.

(Continued)

*Primary Examiner* — Jessica E Whiteley
(74) *Attorney, Agent, or Firm* — Seed IP Law Group LLP

(57) ABSTRACT

Method for preparing a ceramic-polymer nanocomposite is provided. The method includes providing a polymer comprising radicals on a surface thereof; contacting the polymer with a functionalizing agent to form a functionalized polymer; and either (i) grafting a cross-linking agent onto the functionalized polymer to form a graft copolymer, and attaching ceramic nanostructures to the graft copolymer to form a ceramic-polymer nanocomposite, or (ii) grafting a cross-linking agent onto ceramic nanostructures to form modified ceramic nanostructures, and attaching the modified ceramic nanostructures to the functionalized polymer to form a ceramic-polymer nanocomposite. A ceramic-polymer nanocomposite and use of the ceramic-polymer nanocomposite are also provided.

18 Claims, 21 Drawing Sheets

(56) References Cited

OTHER PUBLICATIONS

He et al., "Preparation of exfoliated isotactic polypropylene/alkyl-triphenylphosphonium-modified montmorillonite nanocomposites via in situ intercalative polymerization," *Polymer* 47(6):1767-1771, 2006.
Kim et al., "Phosphonic Acid-Modified Barium Titanate Polymer Nanocomposites with High Permittivity and Dielectric Strength," *Advanced Materials* 19(7):1001-1005, 2007.
Lee et al., "Flexible High Performance Capacitors for Portable Power Systems," *Preprints of Papers-American Chemical Society, Division of Fuel Chemistry* 57(1):850-851, 2012.
Li et al., "Electric energy storage properties of poly(vinylidene fluoride)," *Applied Physics Letters* 96(19):192905, 2010. (4 pages).
Li et al., "Electrical Energy Storage in Ferroelectric Polymer Nanocomposites Containing Surface-Functionalized $BaTiO_3$ Nanoparticles," *Chemistry of Materials* 20(20):6304-6306, 2008.
Li et al., "In Situ Catalytic Encapsulation of Core-Shell Nanoparticles Having Variable Shell Thickness: Dielectric and Energy Storage Properties of High-Permittivity Metal Oxide Nanocomposites," *Chemistry of Materials* 22(18):5154-5164, 2010.
Li et al , "Influence of Crystalline Properties on the Dielectric and Energy Storage Properties of Poly(vinylidene fluoride)," *Journal of Applied Polymer Science* 122(3):1659-1668, 2011.
Li et al., "Nanocomposites of Ferroelectric Polymers with $TiO_2$ Nanoparticles Exhibiting Significantly Enhanced Electrical Density," *Advanced Materials* 21(2):217-221, 2009.
Lin et al., "Dopant induced hollow $BaTiO_3$ nanostructures for application in high performance capacitors," *Journal of Materials Chemistry* 21(41):16500-16504, 2011.
Lin et al., "Formation of PVDF-g-HEMA/$BaTiO_3$ nanocomposites via in situ nanoparticle synthesis for high performance capacitor application," *Journal of Materials Chemistry A* 1(46):14455-14459, 2013.
Mimura et al., "Synthesis of $BaTiO_3$ nanoparticle/poly(2-hydroxyethyl methacrylate) hybrid nanofibers via electrospinning," *Composites Science and Technology* 70(3):492-497, 2010.
Mizutani et al., "Preparation of Spherical Nanocomposites Consisting of Silica Core and Polyacrylate Shell by Emulsion Polymerization," *Journal of Applied Polymer Science* 99(3):659-669, 2006.
Nakagawa, "Chemical reforming of polymer films. II. Reaction of ultra-violet-preirradiated vinylidene chloride-vinyl chloride copolymer films with aqueous ammonia," *Kogyo Kagaku Zasshi* 69(4):755-758, 1966 & *Chemical Abstracts*, Accession No. 1966:483086. (1 page).
Parvatikar et al., "Frequency-Dependent Conductivity and Dielectric Permittivity of Polyaniline/$CeO_2$ Composites," *Journal of Applied Polymer Science* 100(2):1403-1405, 2006.
Ramesh et al., "Dielectric Nanocomposites for Integral Thin Film Capacitors: Materials, Design, Fabrication and Integration Issues," *IEEE Transactions on Advanced Packaging* 26(1):17-24, 2003.
Schroeder et al., "High-Performance Organic Transistors Using Solution-Processed Nano-particle Filled High-$k$ Polymer Gate Insulators," *Advanced Materials* 17(12):1535-1539, 2005.
Stefanescu et al., "Multifunctional PMMA-Ceramic composites as structural dielectrics," *Polymer* 51(24):5823-5832, 2010.
Tchoul et al., "Assemblies of Titanium Dioxide-Polystyrene Hybrid Nanoparticles for Dielectric Applications," *Chemistry of Materials* 22(5):1749-1759, 2010.
Thakur et al., "Green aqueous modification of fluoropolymers for energy storage applications," *Journal of Materials Chemistry* 22(13):5951-5959, 2012.
Thakur et al., "Poly(vinylidene fluoride)-graft-poly(2-hydroxyethyl methacrylate): a novel material for high energy density capacitors," *Journal of Materials Chemistry* 21(11):3751-3759, 2011.
Xie et al., Core-shell structured poly(methyl methacrylate)/$BaTiO_3$ nanocomposites prepared by in situ atom transfer radical polymerization: a route to high dielectric constant materials with the inherent low loss of the base polymer, *Journal of Materials Chemistry* 21(16):5897-5906, 2011.
Xu et al., "High-K Nanocomposites with Core-Shell Structured Nanoparticles for Decoupling Applications," *2005 Electronic Components and Technologies Conference*, pp. 1234-1240. (7 pages).
Yamada et al., "Piezoelectricity of a high-content lead zirconate titanate/polymer composite," *Journal of Applied Physics* 53(6):4328-4332, 1982.
Yang et al., "Dielectric properties of polymer nanoparticle composites," *Polymer* 48(3):791-798, 2007.
Yang et al., "High K Polymer-ceramic Nano-composite Development, Characterization, and Modeling for Embedded Capacitor RF Application," *Electronic Components and Technology Conference*, 2001, Proceedings., 51st, Orlando, Florida, May 29-Jun. 1, 2001, pp. 1408-1412. (5 pages).
Zhang et al., "Energy storage study of ferroelectric poly(vinylidene fluoride-trifluoroethylene-chlorotrifluoroethylene) terpolymers," *Polymer* 50(2):707-715, 2009.
Zhou et al., "Electrical Energy Density and Discharge Characteristics of a Poly(vinylidene fluoride-chlorotrifluoroethylene) Copolymer," *IEEE Transactions on Dielectrics and Electrical Insulation* 14(5):1133-1138, 2007.
Zhou et al., "Improving Dielectric Properties of $BaTiO_3$/Ferroelectric Polymer Composites by Employing Surface Hydroxylated $BaTiO_3$ Nanoparticles," *ACS Applied Materials & Interfaces* 3(7):2184-2188, 2011.

\* cited by examiner

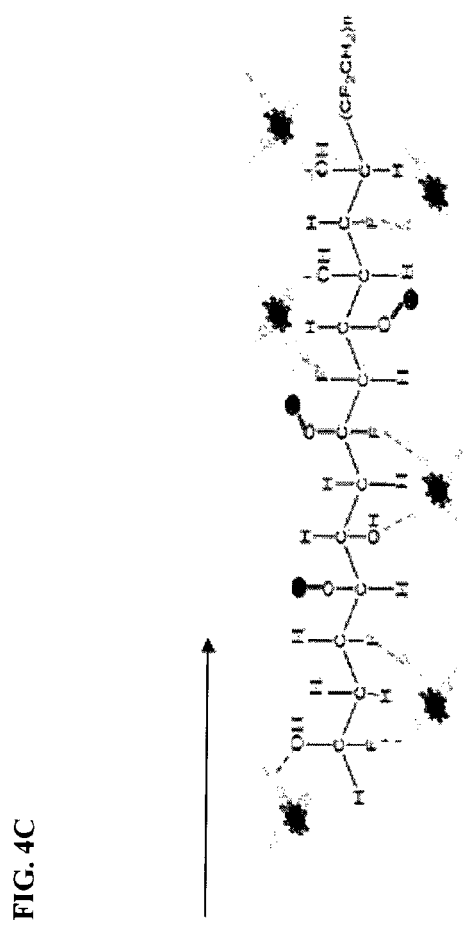
FIG. 4C
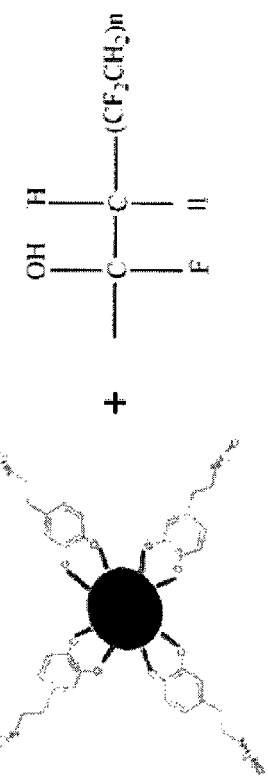

CERAMIC-POLYMER NANOCOMPOSITES

CROSS-REFERENCE TO RELATED APPLICATION

This application claims the benefit of priority of U.S. provisional application No. 61/820,375 filed on 7 May 2013, the content of which is incorporated herein by reference in its entirety for all purposes.

TECHNICAL FIELD

The invention relates to methods of preparing ceramic-polymer nanocomposites and ceramic-polymer nanocomposites prepared thereof.

BACKGROUND

High dielectric constant polymer composites have attracted great interest recently for applications such as bypass capacitor in microelectronics and energy-storage devices. By combining ceramic materials of large permittivity with polymers of high breakdown strength, devices having superior energy storage capacity may be obtained.

Compared to conventional ceramic materials, polymer-based dielectric materials offer processing advantages, such as mechanical flexibility and ability to be molded onto intricate configurations for electronic and electric devices with reduced volume and weight.

Because of differences in surface characteristics between the inorganic reinforcement fillers and the organic matrix, however, it is difficult to disperse the reinforcement fillers uniformly. This in turn affects electrical performance of the inorganic-polymer composites negatively.

In view of the above, inorganic-polymer nanocomposites have been prepared using methods, such as mechanical blending and solution mixing, to improve nanoparticle dispersion in the polymer matrix. These methods suffer from drawbacks such as nanoparticle aggregation and phase separation as a result of host guest incompatibilities, which are detrimental to electrical properties of the inorganic-polymer nanocomposites.

In view of the above, there remains a need for a method to prepare inorganic-polymer nanocomposites that overcomes or at least alleviates one or more of the above-mentioned problems.

SUMMARY

In a first aspect, the invention refers to a method of preparing a ceramic-polymer nanocomposite. The method comprises
a) providing a polymer comprising radicals on a surface thereof;
b) contacting the polymer with a functionalizing agent to form a functionalized polymer; and
c) either
 (i) grafting a cross-linking agent onto the functionalized polymer to form a graft copolymer, and attaching ceramic nanostructures to the graft copolymer to form a ceramic-polymer nanocomposite, or
 (ii) grafting a cross-linking agent onto ceramic nanostructures to form modified ceramic nanostructures, and attaching the modified ceramic nanostructures to the functionalized polymer to form a ceramic-polymer nanocomposite.

In a second aspect, the invention refers to a ceramic-polymer nanocomposite prepared by a method according to the first aspect.

In a third aspect, the invention refers to use of a ceramic-polymer nanocomposite prepared by a method according to the first aspect in an electrostatic capacitor, an energy storage device, power electronics, and display device.

BRIEF DESCRIPTION OF THE DRAWINGS

The invention will be better understood with reference to the detailed description when considered in conjunction with the non-limiting examples and the accompanying drawings, in which:

FIG. 1A shows chain initiation; FIG. 1B shows dehydrofluorination with an alkaline solution; FIG. 1C shows chain termination; and FIG. 1D shows binding of PVDF-g-HEMA on $BaTiO_3$ nanoparticle surface. The nanocomposite shown has a core-shell structure, in that the ceramic $BaTiO_3$ nanostructures form a shell surrounding the PVDF-g-HEMA polymer core, wherein the $BaTiO_3$ nanostructures covers at least partially, a surface of the PVDF-g-HEMA polymer.

Referring to FIG. 2C, lattice spacing of 0.285 nm corresponds to inter-planar distance of the <110> plane in cubic $BaTiO_3$. The energy dispersive spectroscopy (EDS) line scan and elemental map further confirm distribution of $BaTiO_3$ nanostructures on the outer shell of PVDF polymeric spheres as shown in FIG. 2D. Further, $BaTiO_3$ nanostructures are evident from presence of high Ba and Ti content found at the peripheral in the TEM-EDS line scan.

FIG. 4A to FIG. 4C depict a scheme for in situ polymerization of dopamine-$BaTiO_3$/PVDF, where FIG. 4A shows surface functionalization of $BaTiO_3$ nano-powders with dopamine; FIG. 4B shows dehydrofluorination with an alkaline solution; and FIG. 4C shows binding of dopamine-BaTiO$_3$ on PVDF nanoparticle surface.

DETAILED DESCRIPTION

Figure 1A:
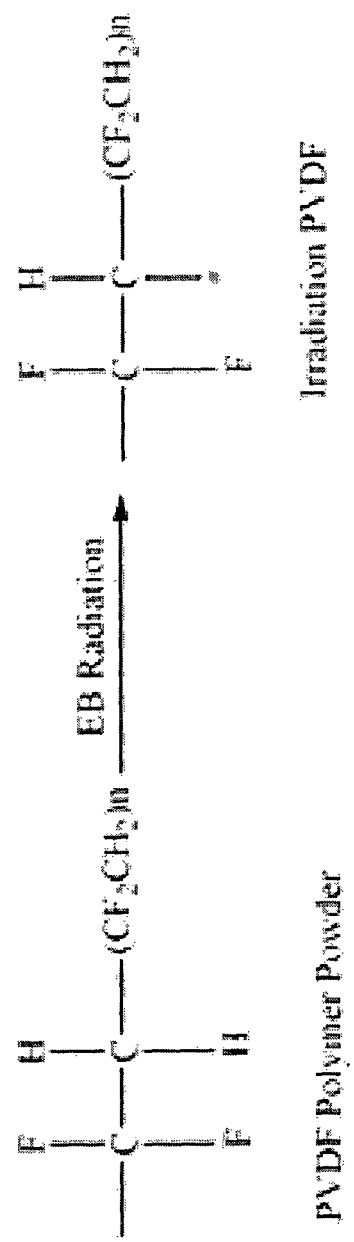
FIG. 1A to FIG. 1D depict a scheme for in situ polymerization of PVDF-g-HEMA/$BaTiO_3$ nanocomposite, where

By grafting a cross-linking agent to a polymer or to ceramic nanostructures, agglomeration of ceramic nanostructures in the ceramic-polymer nanocomposite may be disrupted. This translates into homogeneously dispersed ceramic nanostructures in the ceramic-polymer nanocomposite. In various embodiments, the ceramic nanostructures may at least partially or substantially cover a surface of the polymer such that they form a shell over the polymer core. Advantageously, the method may be carried out without using any catalyst and chemical initiators. Further, presence of the cross-linking agent improves compatibility between the ceramic nanostructures, which act as fillers, and the polymer matrix to allow formation of uniform nanocomposite films even at high filler concentrations.

Significant improvements in dielectric properties and energy density have been demonstrated for ceramic-polymer nanocomposites prepared using a method disclosed herein. In one embodiment, for example, dielectric constant obtained for core-shell structured PVDF-g-HEMA/BaTiO$_3$ is 30 times higher than that of BaTiO$_3$/PVDF composite performed at 100 Hz. In another embodiment, energy density obtained for dopamine-BaTiO$_3$/PVDF is 18.38 J/cm$^3$ at 266 MV/m, which is a significant improvement over that of BaTiO$_3$PVDF, where typical BaTiO$_3$/PVDF energy density is only in the range of 2 to 3 J/cm$^3$.

Accordingly, the present invention refers in a first aspect to a method for preparing a ceramic-polymer nanocomposite. The term "nanocomposite" as used herein refers to a material formed from two or more different components, in which one of the components has a size in the nanometer range, and the material having a functional and/or a structural property that is different from that of the individual components.

The nanocomposite comprises or consists essentially of a polymer and ceramic nanostructures. As used herein, the term "polymer" refers to a large molecule containing a plurality of repeating units or monomers. The polymer may be formed via polymerization of 10, 100, 1000, 10000 or more repeating units or monomers, and the repeating units or monomers may be connected to each other by covalent bonds. The polymer may be a homopolymer, where it is made up of a single type of monomer; a copolymer, where it is made up of two different types of monomers; a terpolymer, where it is made up of three different types of monomers; or combinations thereof.

Examples of polymers include, but are not limited to, poly(viylidene fluoride) (PVDF) and its copolymers such as poly(vinylidene fluoride-co-trifluoroethylene) (PVDF-TrFE), poly(vinylidene fluoride-co-hexafluoropropylene) (PVDF-HFP), poly(vinylidene fluoride-co-trifluoroethylene) (PVDF-TrFE-GTFE); polycarbonate (PC), epoxy resin, sulfonate styrene-b-(ethylene-ranbutylene)-b-styrene (S-SEBS), polypropylene (PP), poly(methyl methacrylate) (PMMA), polystyrene (PS), mixtures thereof, and copolymers thereof.

The polymer may comprise or consist of a fluoropolymer. The term "fluoropolymer" as used herein refers to a polymer having at least one fluorine-containing monomer. The fluoropolymer may be a homopolymer, a copolymer, or a terpolymer, depending on the number of different types of monomers that are used to form the flruopolymer.

The fluoropolymer may be selected from the group consisting of polytetrafluoroethylene (PTFE), fluorinated ethylene-propylene (FEP), perfluoroalkoxy polymer resin (PFA), polychlorotrifluoroethylene (PCTFE), polytrifluoroethylene, polyvinyl idene fluoride (PVDF), polyvinyl fluoride (PVF), tetrafluoroethylene-ethylene copolymer resin (ETFE), fluoroethylene propylene ether resin (EPE), copolymers thereof, and terpolymers thereof.

In various embodiments, the polymer comprises or consists of a polymer or copolymer of tetrafluoroethylene, hexafluoropropylene, and/or vinylidene fluoride. In specific embodiments, the polymer comprises or consists of a polymer or copolymer of vinylidene fluoride selected from the group consisting of polyvinylidene fluoride (PVDF), poly (vinylidenefluoride-co-trifluoroethylene) (PVDF-TrFE), poly(vinylidenefluoridehexafluoropropylene) (PVDF-HEP), poly(vinylidene fluoride chlorotrifluoroethylene) (PVDF-CTFE), vinylidene fluoride-trifluoroethylene-chlorofluoroethylene terpolymer (PVDF-TrFE-CFE), and mixtures thereof.

The method includes providing a polymer comprising radicals on a surface thereof. Generally, any method that is able to generate radicals on the polymer surface may be used. For example, this may be achieved via a chemical route, etching, or by exposure to a high energy radiation. In various embodiments, providing a polymer comprising radicals on a surface thereof may include irradiating a polymer with radiation.

As used herein, the term "radiation" refers to energy that is being radiated or transmitted in the form of rays, waves, or particles. The radiation may, for example, be electromagnetic waves in the visible or invisible spectrum, such as visible light, infrared, ultraviolet light, radio waves, plasma, X-rays, and γ-rays to name a few. The radiation may also be in the form of ionizing radiation, such as electron beam and ion beam. Generally, the type of radiation that may be used is not limited as long as radicals on a polymer are generated.

In various embodiments, providing a polymer comprising radicals on a surface thereof comprises irradiating a polymer with radiation selected from the group consisting of ultraviolet light, plasma, X-rays, γ-rays, electron beam, ion beam, and combinations thereof. In specific embodiments, providing a polymer comprising radicals on a surface thereof comprises irradiating a polymer with an electron beam.

Advantageously, by irradiating a polymer with radiation, this allows surface modification on the molecular scale of chemically stable materials such as PVDF and its copolymers to take place. For example, the radiation is able to break the chemical bonds of the fluoropolymer to produce radicals on the fluoropolymer. In the case of PVDF and its copolymers, for example, bond strength of C—H is weaker than C—C and C—F bonds. When low radiation dose is used, selective breakage of C—H bonds may take place to allow abstraction of H from the C—H bonds. Accordingly, active sites of PVDF to initiate polymerization may be alkyl radicals, such as that shown in FIG. 1A.

The method for preparing a ceramic-polymer nanocomposite includes contacting the polymer with a functionalizing agent to form a functionalized polymer.

As used herein, the term "functionalizing agent" refers to a compound or a moiety that alters chemical nature of the polymer surface by introducing a functional group on the polymer. For example, the functionalizing agent may introduce a functional group on the polymer by chemically reacting with the polymer. The functionalizing agent may also introduce a functional group on the polymer by depositing a layer of the functionalizing agent on the polymer. Examples of functional group that may be introduced by the functionalizing agent the polymer include, but are not limited to, a carboxyl group, a hydroxyl group, an epoxy group, an organophosphorous group, and an amine group. In various embodiments, the functional group introduced by the functionalizing agent to the polymer is a hydroxyl group.

The functionalizing agent may comprise or consist of an alkaline solution selected from the group consisting of alkali metal hydroxides, ammonium hydroxide, and mixtures thereof. By reacting alkali metal hydroxides with the polymer, for example, the polymer may be functionalized with hydroxyl groups on its surface. In various embodiments, the functionalized polymer comprises a hydroxyl group.

Examples of alkali metal hydroxides that may be used include lithium hydroxide (LiOH), sodium hydroxide (NaOH), potassium hydroxide (KOH), rubidium hydroxide (RbOH), and caesium hydroxide (CsOH). In specific embodiments, the functionalizing agent comprises or consists of sodium hydroxide.

The method of the first aspect includes either (i) grafting a cross-linking agent onto the functionalized polymer to form a graft copolymer, and attaching ceramic nanostructures to the graft copolymer to form a ceramic-polymer nanocomposite, or (ii) grafting a cross-linking agent onto ceramic nanostructures to form modified ceramic nanostructures, and attaching the modified ceramic nanostructures to the functionalized polymer to form a ceramic-polymer nanocomposite.

The term "cross-linking agent" as used herein refers to a compound that is able to chemically bond to the polymer and to the ceramic nanoparticles. The cross-linking agent may contain one or more functional groups, such as hydroxyl groups, for chemically bonding with the polymer and the ceramic nanoparticles. In various embodiments, the cross-linking agent is selected from the group consisting of 2-hydroxymethyl methacrylate (HEMA), dopamine, and mixtures thereof. Although use of cross-linking agents having a hydroxyl group is desirable, other cross-linking agents may also be used. Examples include silanes, such as 3-Aminopropyltriethoxysilane, which is commercially available as KH550.

In embodiments where the cross-linking agent is dopamine, the dopamine may be dissolved in a suitable solvent such as a Tris-buffer solution. The term "Tris-buffer solution" refers to a buffer solution comprising tris(hydroxymethyl)-amino-methane having the chemical formula $(HOCH_2)_3CNH_2$, and which may be used to maintain pH of the solution at a constant level. When dopamine is grafted onto the ceramic nanoparticles, for example, it may undergo a spontaneous oxidation reaction to form polydopamine. The hydroxyl groups on the polydopamine modified nanoparticles may also act as bridge links between the ceramic nanostructures and the polymer matrix to prevent aggregate formation and enhance dispersion of the ceramic nanostructures in the polymer matrix.

The term "grafting" is used to refer to chemical attachment of a compound and/or a moiety onto another material. As mentioned above, a cross-linking agent may be grafted onto the functionalized polymer to form a graft copolymer, or may be grafted onto ceramic nanostructures to form modified ceramic nanostructures. For example, when the cross-linking agent comprises or consists of HEMA, it may be grafted onto a fluoropolymer such as PVDF to form a PVDF-g-HEMA copolymer. As another example, when the cross-linking agent comprises or consists of dopamine, it may be grafted onto a ceramic nanoparticle, such as barium titanate, to form a modified ceramic nanoparticle.

To form the ceramic-polymer nanocomposite, ceramic nanostructures are attached to the graft copolymer. Alternatively, when cross-linking agents are grafted onto ceramic nanostructures, the ceramic-polymer nanocomposite may be formed by attaching ceramic nanostructures having cross-linking agents grafted thereon to the functionalized polymer.

As used herein, the term "ceramic nanostructures" refers to nanostructures having at least one dimension in the nanometer range, and which comprise or consists of inorganic, non-metallic solids having dielectric properties. The ceramic materials may have an amorphous structure or be at least partially crystalline.

Examples of nanostructures that may be used include nanoparticles, nanopowder, nanorods, nanowires, nanotubes, nanodiscs, nanoflowers, nanoflakes and nanofilms. In various embodiments, the ceramic nanostructures are ceramic nanoparticles.

In various embodiments, at least one dimension of the ceramic nanostructures is less than 100 nm. For example, the at least one dimension of the ceramic nanostructure may have a length in the range of about 1 nm to about 100 nm, about 1 nm to about 80 nm, about 1 nm to about 60 nm, about 1 nm to about 40 nm, about 10 nm to about 100 nm, about 10 nm to about 80 nm, about 10 nm to about 60 nm, about 10 nm to about 40 nm, about 20 nm to about 80 nm, or about 30 nm to about 60 nm.

The ceramic nanostructures may comprise or consist of a ceramic material such as, but are not limited to, barium titanate, strontium titanate, calcium titanate, magnesium titanate, neodymium titanate, lead titanate, lead zirconate, barium zirconate, barium titanyl oxalate, boron nitride, titanium nitride, silicon nitride, tantalum nitride, and mixtures thereof. In various embodiments, the ceramic nanostructures are selected from the group consisting of barium titanyl oxalate, barium titanate, boron nitride, titanium nitride, silicon nitride, tantalum nitride, and mixtures thereof. In specific embodiments, the ceramic nanostructures comprise or consist of barium titanate.

The ceramic nanostructures may be essentially monodisperse, whereby the term "monodisperse" refers to the nanostructures of at least substantially the same size. As the nanostructures may not be regular in shape and/or be of the same shape, the term "size" as used herein refers to the maximal dimension of the nanostructures. In various embodiments, the maximal dimension of the nanostructure is less than 100 nm.

The ceramic nanostructures may be attached to a surface of the polymer, such that the ceramic nanostructures cover at least partially a surface of the polymer. In various embodiments, the ceramic nanostructures cover a substantial portion of the polymer surface. In so doing, a ceramic-polymer nanocomposite having a core-shell structure, with the ceramic nanostructures making up the shell and the polymer making up the core, may be formed.

In various embodiments, attaching the ceramic nanostructures to the graft copolymer includes functionalizing the ceramic nanostructures with an —OH group, and chemically reacting the ceramic nanostructures with the graft copolymer to covalently attach the ceramic nanostructures to the graft copolymer.

In specific embodiments, functionalizing the ceramic nanostructures with an —OH group may take place by reacting the ceramic nanostructures with an alkaline solution. Examples of alkaline solution that may be used have already been described above. In cases where the functionalizing agent comprises or consists of an alkaline solution, the ceramic nanostructures may react with residual alkaline solution from formation of the functionalized polymer, such that the ceramic nanostructures are functionalized with an —OH group.

Chemically reacting the ceramic nanostructures with the graft copolymer to covalently attach the ceramic nanostructures to the graft copolymer may be carried out at any suitable temperature and for any suitable length of time. In various embodiments, chemically reacting the ceramic nanostructures with the graft copolymer is carried out at a temperature in the range of about 80° C. to about 150° C., such as about 80° C. to about 130√ C., about 80° C. to about 100° C., about 90° C. to about 120° C., about 100° C. to about 150° C., about 90° C., about 100° C. or about 110° C. In specific embodiments, chemically reacting the ceramic nanostructures with the graft copolymer is carried out at about 100° C. In specific embodiments, the reaction is carried out for about 2 hours.

In various embodiments, attaching the modified ceramic nanostructures to the functionalized polymer includes chemically reacting the modified ceramic nanostructures with the functionalized polymer to covalently attach the modified ceramic nanostructures to the functionalized polymer.

In various embodiments, chemically reacting the modified ceramic nanostructures with the functionalized polymer is carried out at a temperature in the range of about 80° C. to about 150° C., such as about 80° C. to about 130° C., about 80° C. to about 100° C., about 90° C. to about 120° C., about 100° C. to about 150° C., about 90° C., about 100° C. or about 110° C. In specific embodiments, chemically reacting the modified ceramic nanostructures with the functionalized polymer is carried out at about 100° C.

Grafting of the cross-linking agent to the functionalized polymer and/or the ceramic nanostructures may be carried out in a reflux condenser. Similarly, attaching ceramic nanostructures to the graft copolymer, and/or attaching the modified ceramic nanostructures to the functionalized polymer to form a ceramic-polymer nanocomposite may also be carried out in a reflux condenser. Advantageously, refluxing provides effective stirring for an extended period of time without the need to add more solvent or the fear of reactants boiling dry in the reaction vessel, as any vapor is immediately condensed in the condenser.

As mentioned above, by grafting a cross-linking agent to a polymer or to ceramic nanostructures, agglomeration of ceramic nanostructures in the ceramic-polymer nanocomposite may be disrupted. This translates into homogeneously dispersed ceramic nanostructures in the ceramic-polymer nanocomposite. Due to the improved dispersion of ceramic nanostructures in the ceramic-polymer nanocomposite, improvements in electric properties such as dielectric properties and energy density have been demonstrated for ceramic-polymer nanocomposites prepared using a method disclosed herein.

The invention refers in a second aspect to a ceramic-polymer nancomposite prepared by a method according to the first aspect. Examples of ceramic nanostructures and polymers that may be used have already been described above.

The ceramic nanostructures may be covalently bonded to the polymers, and may form network connections in the nanocomposite. This reduces the breakdown voltage and increases the dielectric loss of the nanocomposite, and associated thin films containing the nanocomposite.

The ceramic nanostructures are attached to a surface of the polymer. In so doing, the ceramic nanostructures may at least partially cover surface of the polymer, such that a ceramic-polymer nanocomposite having a core-shell structure is formed.

Advantageously, the ceramic nanostructures in the nanocomposites act as a nucleating agent to increase degree of crystallinity of the amorphous polymer matrix. The crystallinity may improve with an increase in loading level of nanostructures. This in turn leads to enhanced polarizability, thereby resulting in improved electrical properties.

The amount of ceramic nanostructures in the ceramic-polymer composite may be in the range of about 5 wt % to about 40 wt %, such as about 5 wt % to about 35 wt %, about 5wt % to about 30 wt %, about 10 wt % to about 40 wt %, about 15 wt % to about 40 wt %, about 20 wt % to about 40 wt %, about 10 wt % to about 30 wt %, about 10 wt %, about 20 wt %, or about 30 wt %. In specific embodiments, the amount of ceramic nanostructures in the ceramic-polymer composite is about 30 wt %.

In line with the above, the amount of polymer in the ceramic-polymer composite may be in the range of about 60 wt % to about 95 wt %, such as about 65 wt % to about 95 wt %, about 70 wt % to about 95 wt %, about 60 wt % to about 90 wt %, about 65 wt % to about 85 wt %, about 65 wt % to about 75 wt %, about 70 wt % to about 75 wt %, about 70 wt %, about 80 wt %, or about 90 wt %. In specific embodiments, the amount of polymer in the ceramic-polymer composite is about 70 wt %.

The invention refers in a further aspect to use of a ceramic-polymer nanocomposite prepared by a method according to the first aspect in an electrostatic capacitor, an energy storage device, power electronics, and display device.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

As used herein, the term "and/or" includes any and all combinations of one or more of the associated listed items. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and genetically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

In exemplary embodiments, in situ synthesis was used to prepare core-shell structured ceramic-polymer nanocomposites, whereby the dielectric nanostructure shell is attached well on insulating polymer core surface to prevent aggregation problem for nanocomposite.

Core-shell structured ceramic-polymer nanocomposites were prepared using various types of cross-linking agents via in situ synthesis methods for the benefit of high energy density capacitors, without involving any catalyst and initiators. In various embodiments, the core-shell structured PVDF-g-HEMA/BaTiO$_3$ powder was formed under reflux, whereby in situ synthesis of the core-shell structured PVDF-g-HEMA/BaTiO$_3$ powder was carried out in a reflux condenser.

From the experiments carried out, it has been found that dielectric constant of 30 wt % core-shell structured PVDF-g-HEMA/BaTiO$_3$ nanocomposite may reach a value of 333 with a dielectric loss 0.73 for in situ synthesis at a frequency of 1 kHz. Energy density of 10 wt % core-shell structured Dopamine-BaTiO$_3$/PVDF nanocomposite may reach a value of 18.38 J/cm$^3$ for in situ synthesis.

Example 1

Mechanism for In Situ Synthesis of Core-shell Structured Ceramic-polymer Nanocomposite Due to very high chemical stability of fluoropolymers, extremely harsh conditions are generally required to modify the surface on the molecular scale. This may be achieved via chemical route, etching, or exposure to high energy radiation. Electron beams are able to break the chemical bonds of fluoropolymers, and produce free radicals depending upon the radiation dose. PVDF polymer was preirradiated using an electron beam.

In the case of PVDF polymer, bond strength of C—H bond is weaker than C—C and C—F bonds. When low radiation dose is used, there is a highest possibility of abstraction of H from C—H bond. Therefore, the active sites of PVDF to initiate the polymerization are the alkyl radicals: (i) mid chain —CF$_2$—C*H—CF$_2$— (ii) and end chain —CF$_2$—C*H$_2$— as shown in FIG. 1A.

Figure 1B:
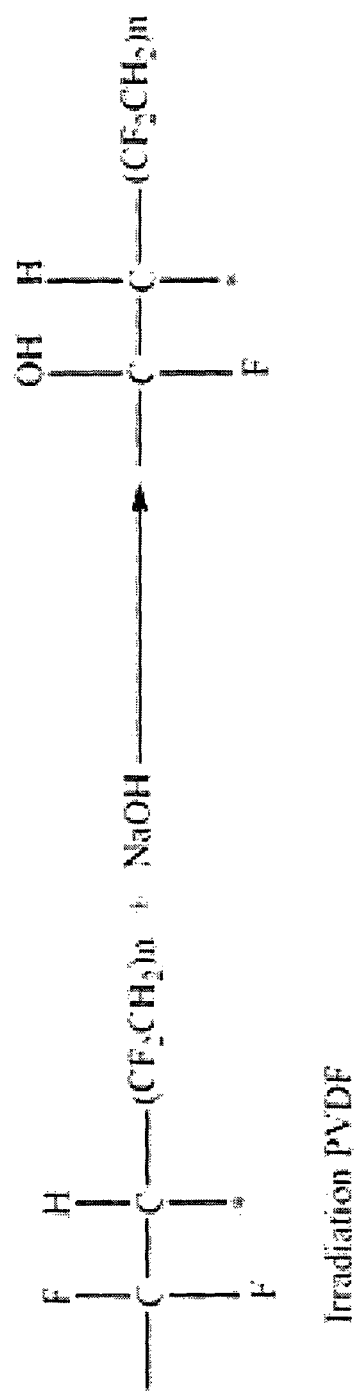

To modify PVDF to form the groups that are capable of reacting with HEMA molecules, a chemical dehydrofluorination with an alkaline solution was carried out. Reaction of PVDF with organic or inorganic bases mainly leads to the elimination of HF and formation of unsaturated bonds, such as that shown in FIG. 1B. In the experiments carried out, irradiated PVDF was suspended in a 1 M NaOH solution in a flask.

After treatment with sodium hydroxide (NaOH), the solution is mixed with hydroxyethylmethacrylate (HEMA) monomer to initiate the graft polymerization of HEMA to PVDF. A definite amount of the monomer (HEMA) was added. The graft polymerization was performed at a particular temperature for a definite time period under stirring in a heating mantle fitted with a reflux condenser which was sealed.

During the first step of initiation the monomer diffuses through the grafted portion and reacts with other radicals.

The second step of propagation involves addition of monomer to the reactive sites of the matrix and further propagation of the monomer forming macroradicals.

Figure 1C:
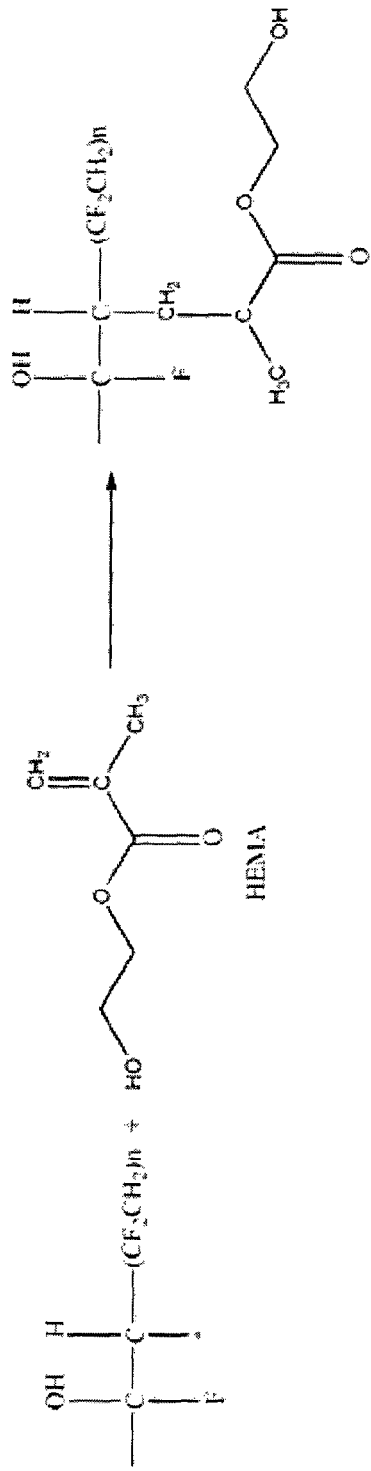

In the third step of termination as shown in FIG. 1C, polymeric macroradicals combine to yield the final product.

Figure 1D:
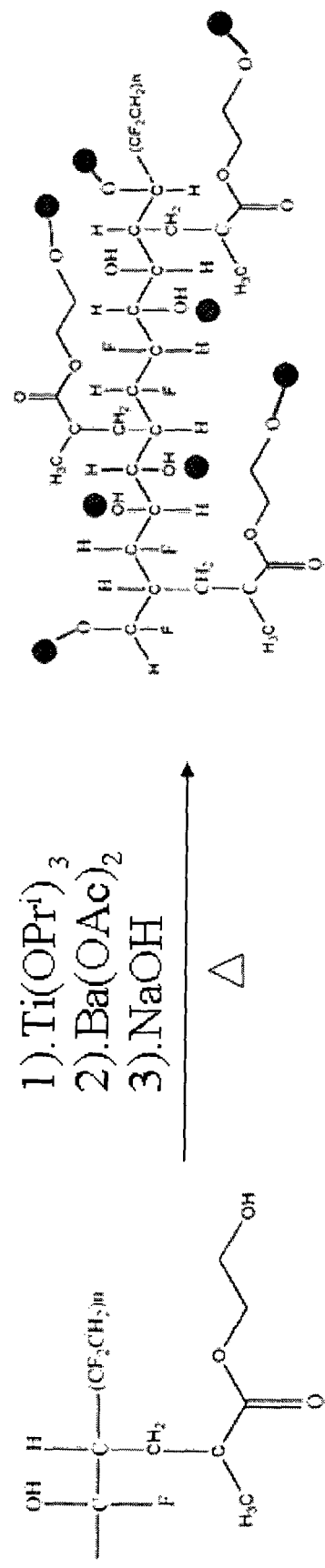

After completion of grafting reaction, BaTiO$_3$ solution is added into the HEMA-g-PVDF solution and the reaction is carried out at 100° C. for 2 h using a reflux condenser. Surface of BaTiO$_3$ nanoparticle contains OH groups. Based on covalent bonding, the —OH group of PVDF-g-HEMA is expected to strongly bind to BaTiO$_3$ surface as illustrated in FIG. 1D.

After the grafting reaction, in situ formed core-shell structured power (PVDF-g-HEMA/BaTiO$_3$) was centrifuged at 8000 rpm and washed with deionized water and methanol for several times to remove residual or unreacted HEMA monomer and possible homopolymers that were formed.

Subsequently, the core-shell structured PVDF-g-HEMA/BaTiO$_3$ power was dried in oven at 100° C.

Example 2

Core-shell Structured Ceramic-polymer Powder Prepared Using Refluxing Method

The HEMA is grafted onto PVDF surface. Subsequently, the in situ BaTiO$_3$ nanoparticle synthesis is carried out using refluxing method in presence of PVDF-g-HEMA to form the PVDF-g-HEMA/BaTiO$_3$ nanocomposites.

Figure 2A:
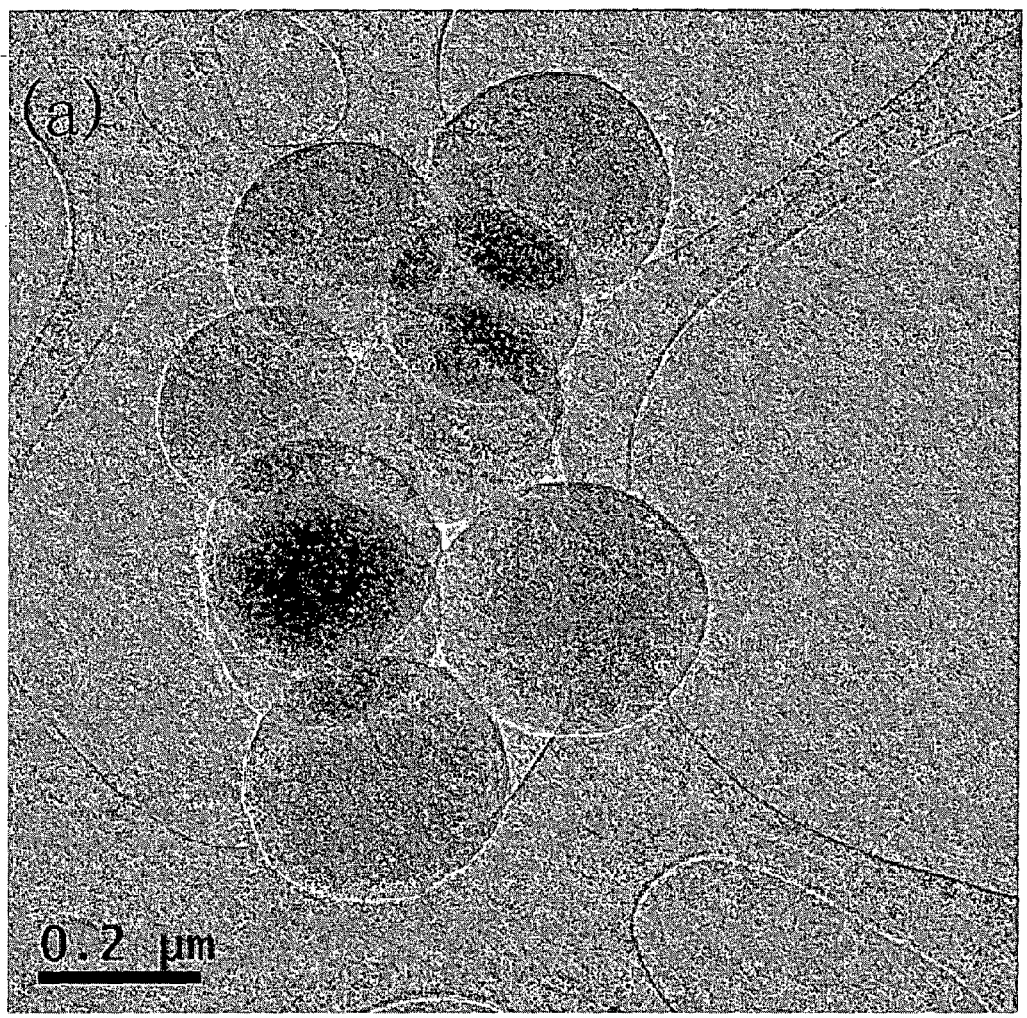
FIG. 2A and FIG. 2B are transmission electron microscopy (TEM) images of pristine PVDF and 30 wt % PVDF-g-HEMA/$BaTiO_3$ in situ powder, respectively. As can be seen from FIG. 2A, pristine PVDF was shown to possess a spherical morphology. It may be clearly seen in FIG. 2B that $BaTiO_3$ nanostructures are dispersed very homogeneously without severe aggregation, and attach very well on the outer surface of PVDF particles after in situ synthesis.
Figure 2B:
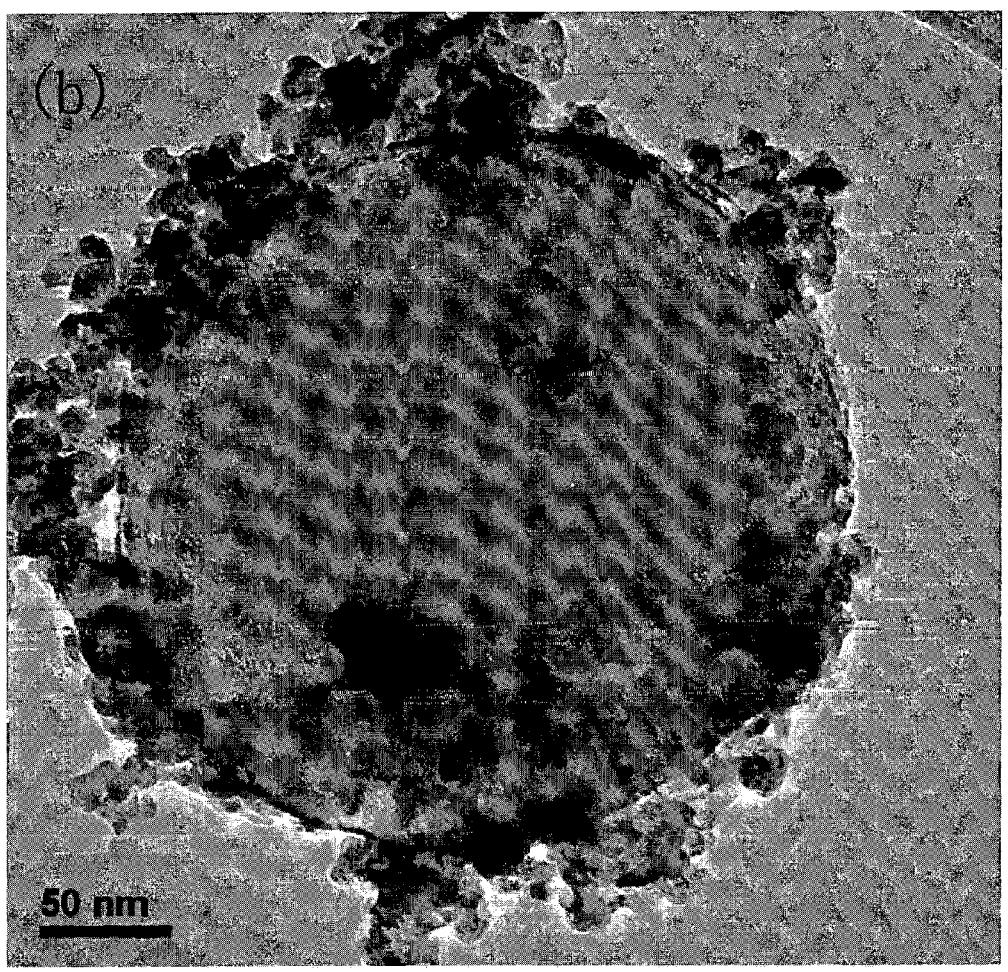
Figure 2C:
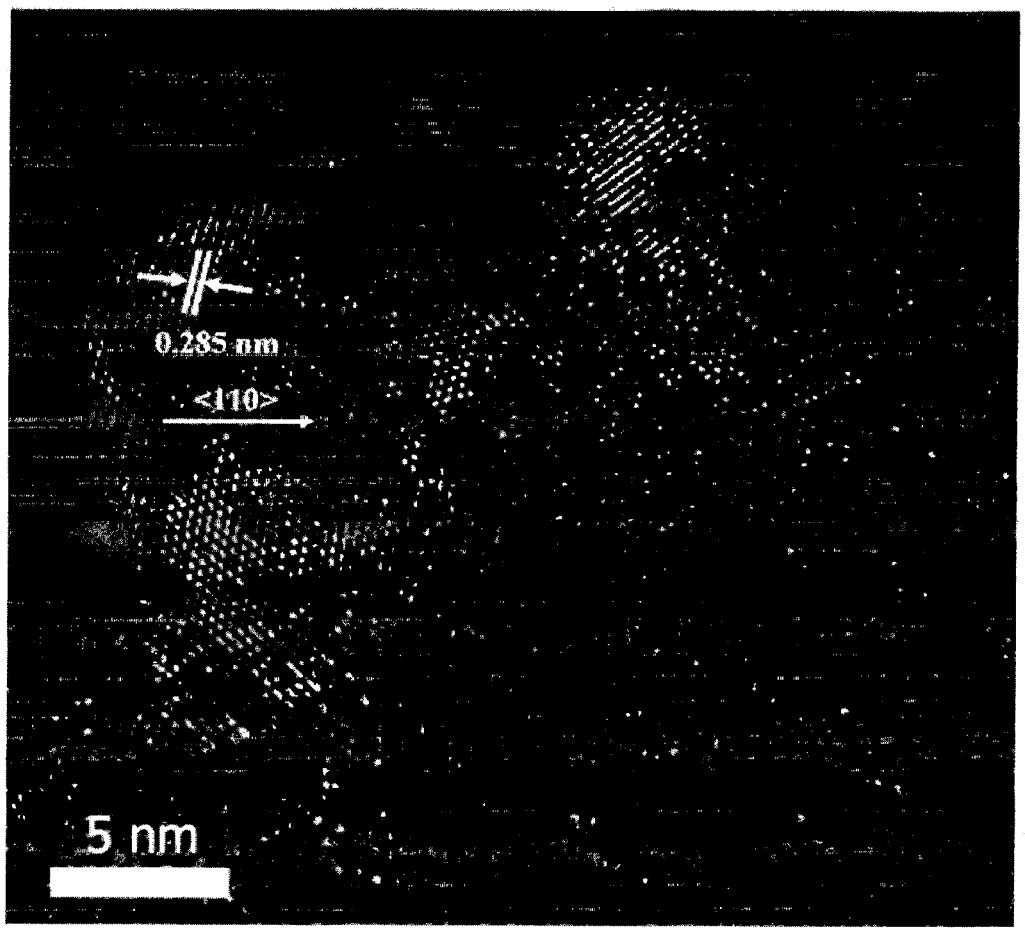
FIG. 2C is a high resolution transmission electron microscopy (HR-TEM) image of a single cubic $BaTiO_3$ nanoparticle on the PVDF surface. Presence of single crystal $BaTiO_3$ small particles having a size in the range of 10 nm to 12 nm may be seen from FIG. 2C.
Figure 2D:
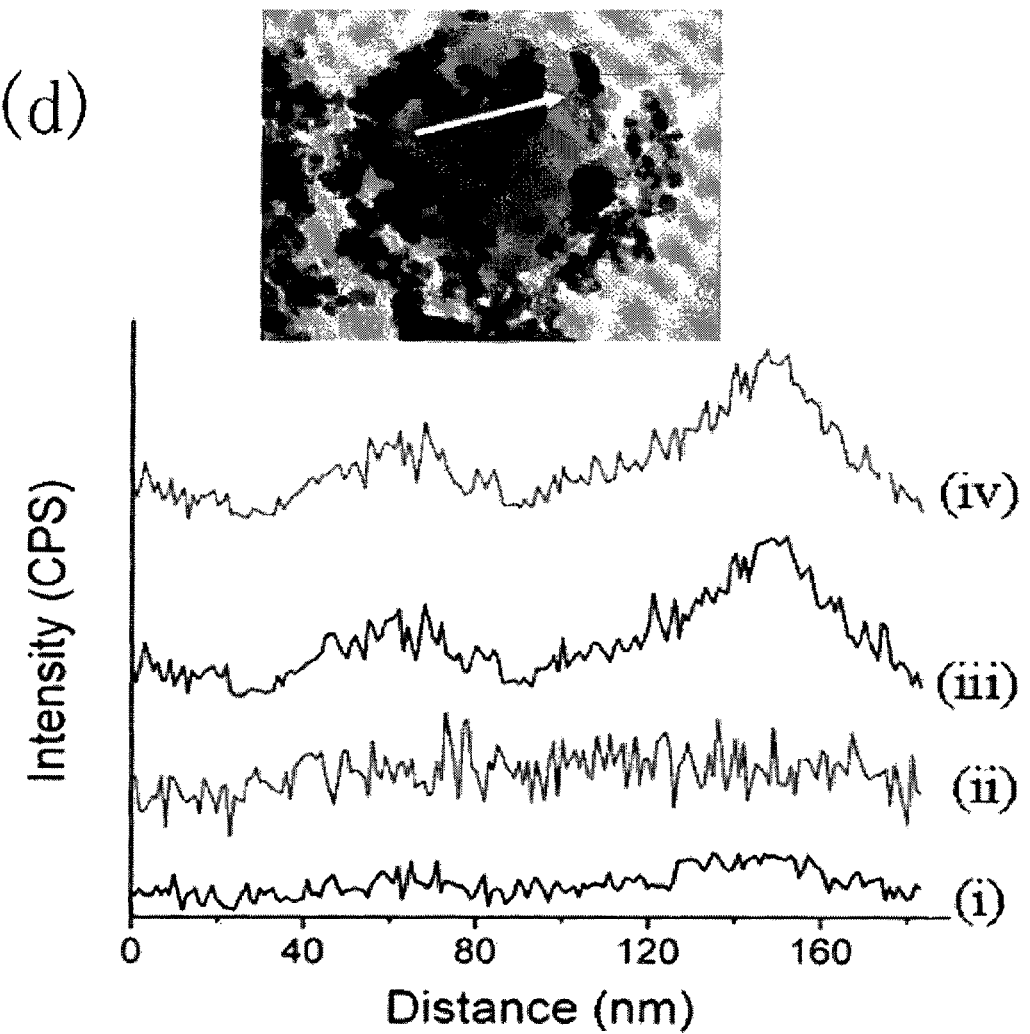
FIG. 2D is a TEM line scan showing (i) oxygen, (ii) fluorine, (iii) barium, and (iv) titanium elements of in situ synthesized of PVDF-g-HEMA/$BaTiO_3$ powder.

It may be clearly seen in FIG. 2B that BaTiO$_3$ nanostructures are dispersed very homogeneously without severe aggregation, and attached very well on the outer surface of PVDF particles after in situ synthesis.

Example 3

Core-shell Structured Ceramic-polymer Powder Prepared by Different Cross-linking Agents Optimal experimental condition of grafting HEMA-g-PVDF has been used as established using the following methodology.

Irradiated PVDF (200 mg) was suspended in a known amount of distilled water in a flask. A definite amount (1.5 mL) of the HEMA monomer was added. Subsequently, nitrogen was purged through the solution for 30 min to remove oxygen. After that, the graft polymerization was performed at a particular temperature (55° C.) under stirring in a heating mantle fitted with a reflux condenser which was sealed. After the completion of reaction, the grafted powder (HEMA-g-PVDF) was filtered and washed with hot water, then extracted by methanol in Soxhlet apparatus to remove residual HEMA monomer and possible homopolymer that was formed. Finally, the HEMA-g-PVDF powder was dried to constant weight in vacuum oven at 50° C.

Figure 8:
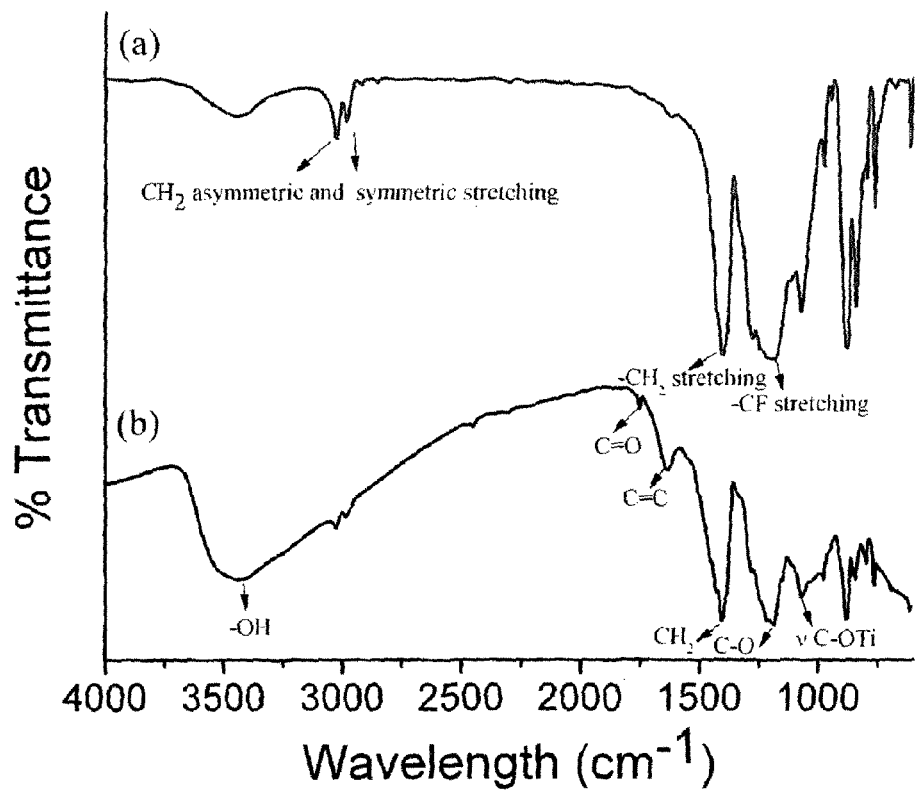
FIG. 8 is a graph showing Fourier transform infrared spectroscopy (FT-IR) spectra of (a) pristine PVDF, (b) PVDF-g-HEMA/BaTiO$_3$ composite with 30 wt % of BaTiO$_3$.

The BaTiO$_3$ solution was prepared by co-precipitation method which contains —OH group on the BaTiO$_3$ nanoparticle surface. Based on covalent bonding, the —OH group of PVDF-g-HEMA is expected to strongly bind to BaTiO$_3$ nanoparticle FT-IR was carried out and spectra as shown in FIG. 8 were generated for pristine PVDF and HEMA-PVDF with 30 wt % of BaTiO$_3$ nanostructures to confirm the successful grafting and in situ synthesis.

In the spectrum of pristine PVDF powder, the characteristic absorption bands at 1198 cm$^{-1}$ and 1412 cm$^{-1}$ are due to the absorption peaks of —CF2 stretching and CH2 stretching modes respectively. The asymmetric and symmetric stretching vibrations of the CH$_2$ group in the pristine PVDF can be located, respectively, at 3028 cm$^{-1}$ and 2975 cm$^{-1}$. The spectrum for HEMA grafted PVDF with 30 wt % BTO nanocomposites clearly shows the existence of vibration modes corresponding to C=O bands at 1749 cm$^{-1}$ and C=C band stretch at around 1635 cm$^{-1}$. The C=C stretch mode at 1635 cm$^{-1}$ can be well attributed to the HEMA monomer, which is present on the surface of the PVDF. The peaks at 1407 cm$^{-1}$ and 1188 cm$^{-1}$ correspond to CH$_2$ and C—O groups in the grafted poly HEMA chains. Meanwhile, the C—H stretching of the PVDF structure located at 2975 cm$^{-1}$ and 3028 cm$^{-1}$ weakened with grafting of HEMA graft chains in the modified PVDF powder.

The above results provide strong evidence for the successful grafting of HEMA onto the PVDF through covalent bonds. The band at 600 cm$^{-1}$ is attributed to Ti—O bond of TiO$_6$ octahedron in BaTiO$_3$. The peak at 1059 cm$^{-1}$ corresponds to v C—OTi group of BaTiO$_3$. When compared to that in FIG. 8(a), the stretching band of the —OH group was shifted to a higher wave number at 3467 cm$^{-1}$ in FIG. 8(b), indicating a change in interaction strength of hydrogen bonding after in situ surface functionalization. In addition, the characteristic absorption at the range of 3300 cm$^{-1}$ to 3500 cm$^{-1}$ assigned to the hydroxyl groups becomes broader and stronger since the HEMA units were introduced on the BaTiO$_3$ surface.

The crystal structures of the synthesized nanocomposites via in situ surface functionalization of HEMA-PVDF with various percentages of BaTiO$_3$ are investigated using XRD.

Figure 9:
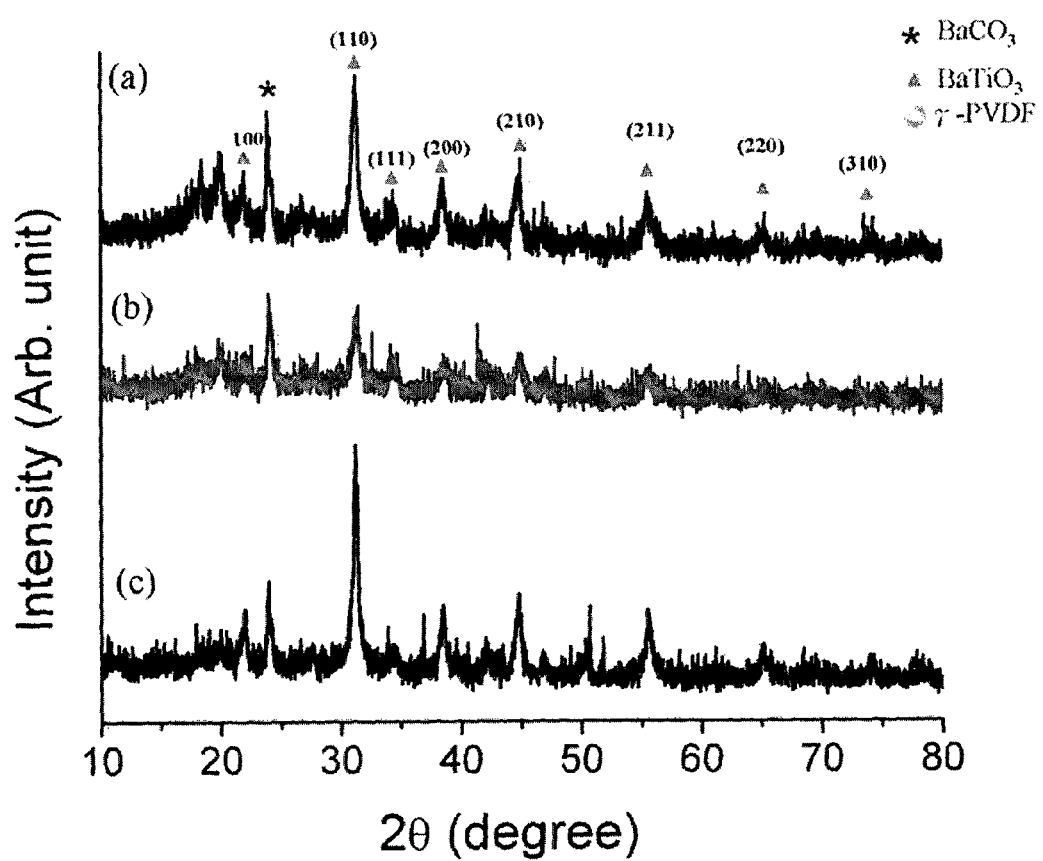
FIG. 9 is a graph showing X-ray diffraction (XRD) patterns of in situ synthesis of PVDF-g-HEMA/BaTiO$_3$ composites with various weight % of BaTiO$_3$ (a) 10, (b) 20 and (c) 30 wt %.

FIG. 9 shows that the corresponding XRD peaks of the in situ surface functionalized BaTiO$_3$ nanostructures belong to the cubic phase (JCPDS card 310174: a=4.031 Å) with various weight % of BaTiO$_3$ (a) 10 wt %, (b) 20 wt % and (c) 30 wt %. The peak at 2θ=26.5°, can be attributed to the (022) diffractions from γ crystal plane, indicating the existence of minority γ-PVDF phase. In addition, the peaks at about 18.5° and 20.1° are the (020) and (110) diffractions of the γ phase crystal planes, respectively. The diffraction peaks due to BaTiO$_3$ become increasingly evident with increasing weight percentage of BaTiO$_3$.

Figure 10A:
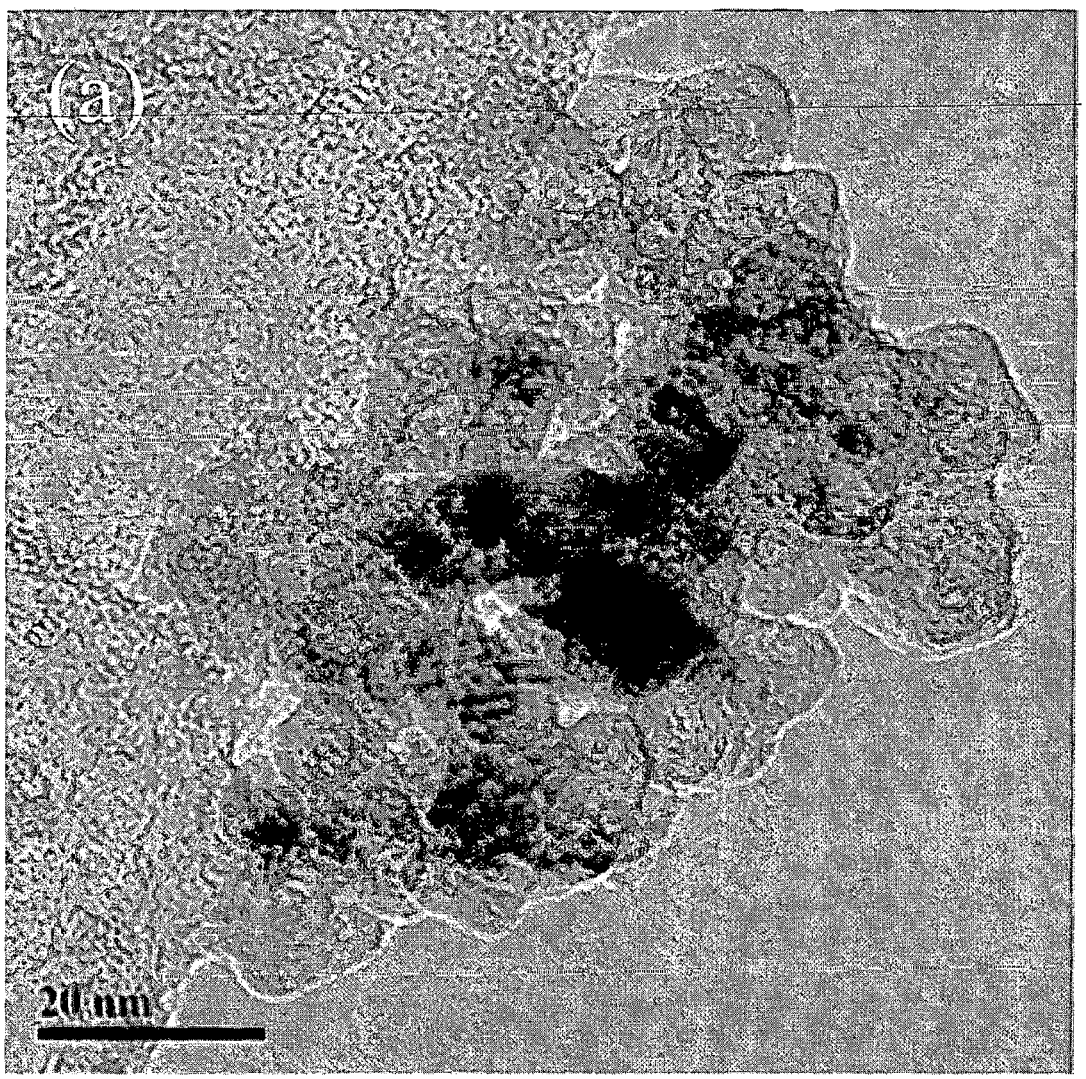
FIG. 10A is a TEM image of pristine BaTiO$_3$ nanostructures.
Figure 10B:
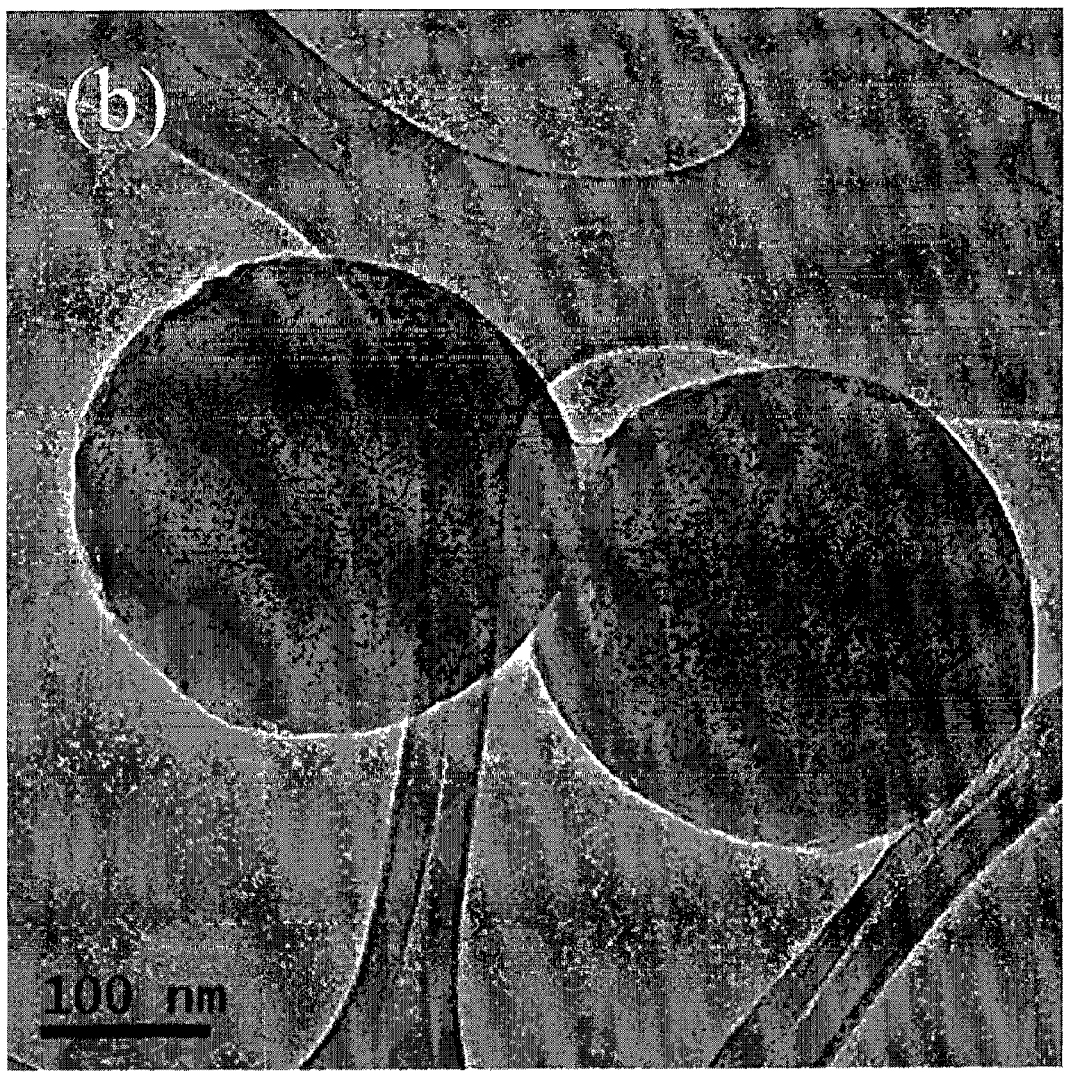
FIG. 10B is a TEM image of pristine PVDF polymer powders.

The size of BaTiO$_3$ nanostructures synthesized using refluxing method was less than 100 nm as shown in FIG. 10A. In addition, the pristine PVDF particle is shown in FIG. 10B. The XRD patterns of BaTiO$_3$ nanostructures and PVDF match well with cubic phase and γ-phase, respectively as shown in FIG. 11, where FIG. 11(a) BaTiO$_3$ nanoparticle synthesized using refluxing method at 100° C./2 hrs, FIG. 11(b) pristine PVDF powder, and FIG. 11(c) 10 wt % dopamine-BaTiO$_3$/PVDF in situ synthesized composite.

Figure 10C:
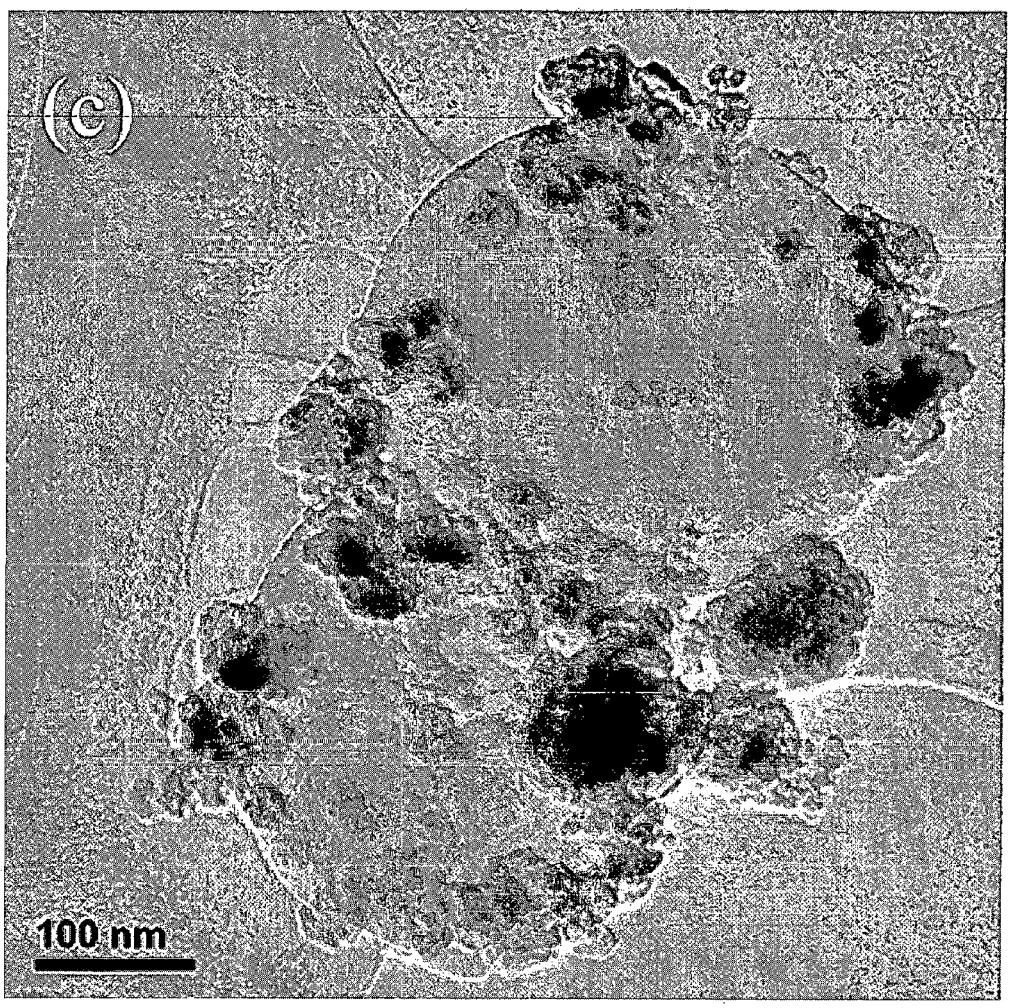
FIG. 10C is a TEM image of 10 wt % dopamine-BaTiO$_3$/PVDF nanocomposite.
Figure 11:
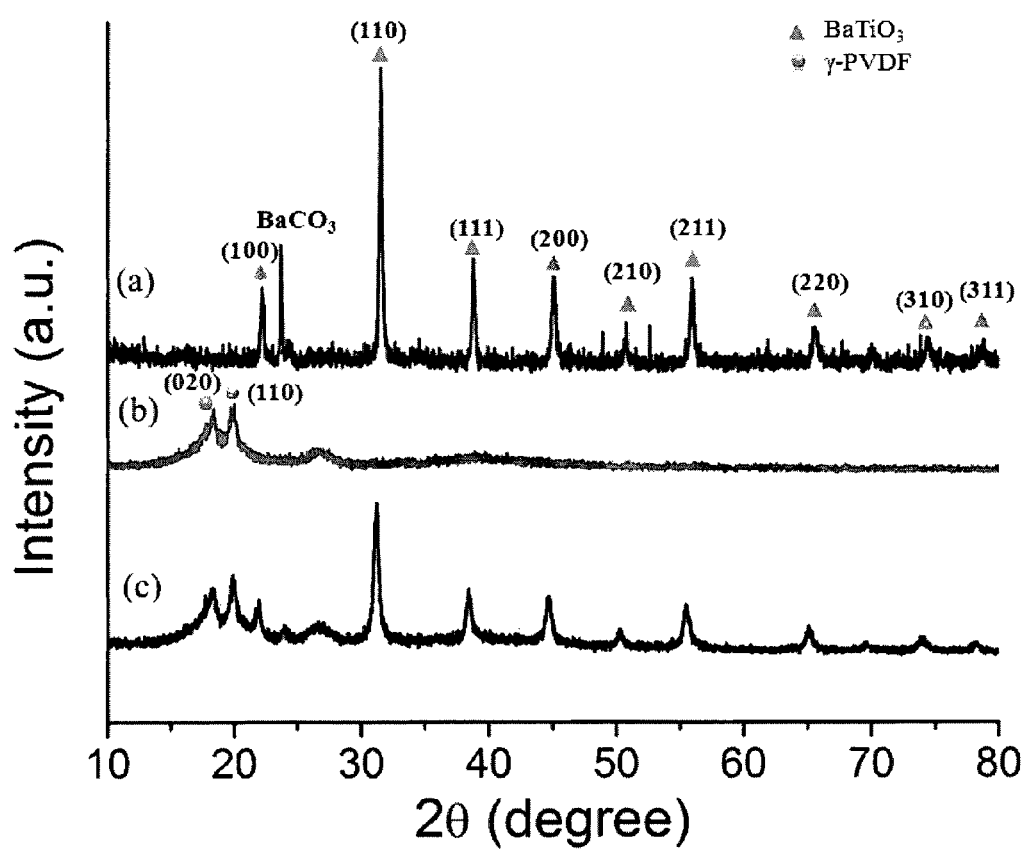
FIG. 11 is a graph showing XRD patterns of (a) BaTiO$_3$ nanoparticle synthesized using refluxing method at 100° C. and for 2 hrs; (b) pristine PVDF powder; and (c) 10 wt % dopamine-BaTiO$_3$/PVDF in situ synthesized composite.

After in situ surface functionalization, the BaTiO$_3$ nanostructures were attached well on the PVDF surface as shown in FIG. 10C. In situ surface functionalization of nanocomposite has been confirmed successfully by FT-IR.

FIG. 10D-(I) shows FT-IR result of the pure nanostructures BaTiO$_3$ synthesized by refluxing method. The broad peak at 3400 cm$^{-1}$ indicates OH group in the pure BaTiO$_3$ sample. The OH group of BaTiO$_3$ nanoparticle is expected to react with OH group of dopamine to form the covalent bond as illustrated by the reaction mechanism in FIG. 10B. FT-IR result of pristine of PVDF power is shown in FIG.

Figure 10D:
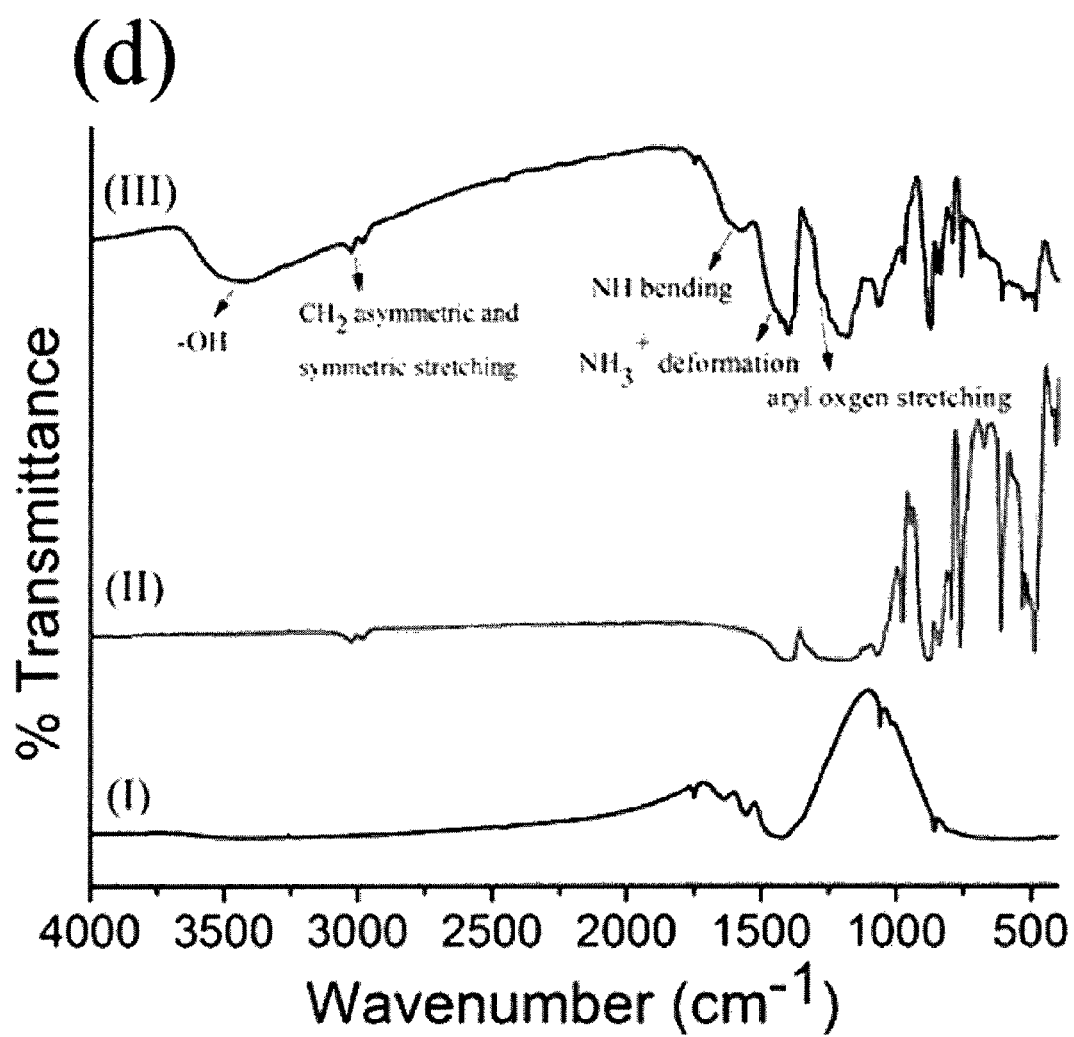
FIG. 10D is a graph showing FT-IR spectra of (I) pure BaTiO$_3$, (II) pristine PVDF; and (III) 10 wt % dopamine-BaTiO$_3$/PVDF particles with 10 wt % of BaTiO$_3$.

10D-(II). The peaks at 2984 cm$^{-1}$ and 3022 cm$^{-1}$ can be assigned to the CH$_2$ asymmetric and symmetric stretching for PVDF. FIG. 10D-(III) shows the FT-IR spectra of BaTiO$_3$-dopamine/PVDF particles after in situ surface functionalization (10 wt % dopamine-BaTiO$_3$/PVDF with 10 wt % BaTiO$_3$). A broad band centered at 3460 cm$^{-1}$ can be assigned to the stretching mode of OH. Several additional vibrations due to various modes of aryl oxygen stretching, NH$_3^+$ deformation and NH bending are observed at 1276 cm$^{-1}$, 1451 cm$^{-1}$, and 1566 cm$^{-1}$, respectively. It confirms the in situ surface functionalization by dopamine was successful on BaTiO$_3$ particle surface.

Example 4

Electrical Properties of Core-shell Structured PVDF-g-HEMA/BaTiO$_3$

Figure 3A:
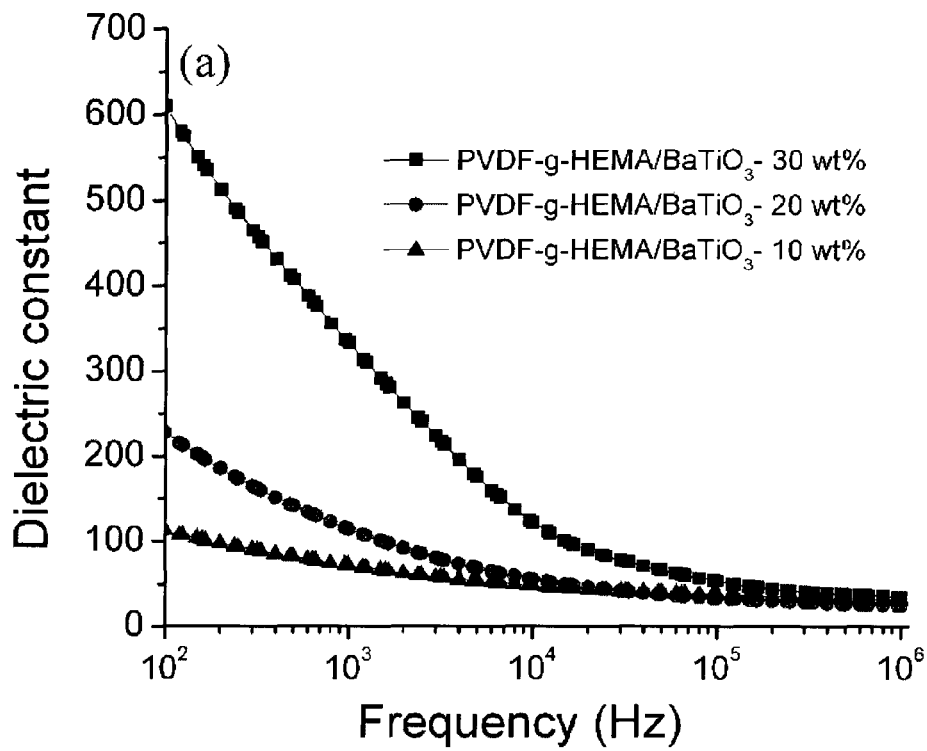
FIG. 3A is a graph showing dependences of dielectric constant of PVDF-g-HEMA/$BaTiO_3$ in situ synthesized composite on frequency measured at room temperature from $10^2$ to $10^6$ Hz.
Figure 3B:
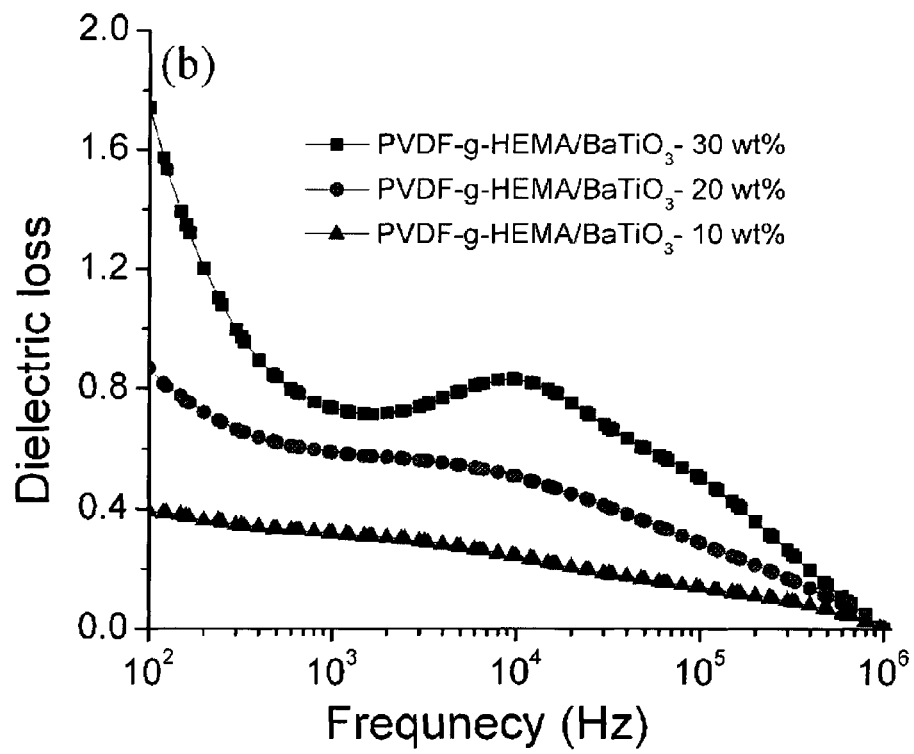
FIG. 3B is a graph showing dependences of dielectric loss of PVDF-g-HEMA/$BaTiO_3$ in situ synthesized composite on frequency measured at room temperature from $10^2$ to $10^6$ Hz. From the results obtained, electrical properties of the core-shell structured nanocomposite have been demonstrated. Promise of core-shell structured PVDF-g-HEMA/$BaTiO_3$ nanocomposites via novel in situ synthesis method for high performance capacitors has been unambiguously demonstrated, with dielectric constant reaching up to 333 and dielectric loss of 0.73 for core-shell structured PVDF-g-HEMA/$BaTiO_3$ 30 wt % at 1 kHz, and a dielectric constant greater than 610 at 100 Hz with 30 wt % $BaTiO_3$.

FIG. 3A and FIG. 3B show respectively, the dielectric constant and dielectric loss for the nanocomposite with various weight percentages of BaTiO$_3$ nanostructures as fillers. After in situ synthesis of the core-shell structured nanocomposite, the BaTiO$_3$ nanostructures were dispersed homogeneously in the PVDF matrix, which minimizes the particle agglomeration issue for the nanocomposite. Hence, the dielectric constant increases throughout the measured frequency range with increasing BaTiO$_3$ wt %.

The dielectric constant of nanocomposite increases sharply and reaches as high as 610 (100 Hz) with 30 wt % BaTiO$_3$ as shown in FIG. 3A. The results show that the dielectric constant of in situ synthesized core-shell structured PVDF-g-HEMA/BaTiO$_3$ composites greatly increases to 13 times higher than those of BaTiO$_3$/PVDF composite at 100 Hz at 0.5 volume fraction of BaTiO$_3$.

The large enhancement in dielectric constant of the core-shell structured nanocomposites with increase in particles loadings demonstrated may be linked to uniform dispersion of the nanostructures as result of improved interaction between hydrophilic polymer matrixes as well as strong bonding between BaTiO$_3$ and PVDF-g-HEMA.

Interaction of the nanostructures with the polymer matrix interfered with the segmental motion or alters the semicrystalline structure of the polymer host, leading to enhanced dielectric properties. In addition, the largest improvement of dielectric constant for the core-shell structured nanocomposites synthesized via the novel in situ synthesis may be attributed to the following.

Firstly, BaTiO$_3$ with a perovskite structure is a strong dielectric material and contributes significantly to the nanocomposite.

Secondly, dielectric constant of HEMA (2-hydroxyethyl metharylate)-graft-poly (vinylidene fluoride) (PVDF) copolymers is much higher with increase in polarizability, due to the high dipole and polarizability of the O—H bond.

Finally, these nanostructures subsequently act as a nucleating agent and improve the degree of crystallinity of the polymer matrix. As the crystalline region in the polymer is responsible for polarization, an improved crystallinity with increase in nanostructures loading offers a high polarizability and an enhanced dielectric constant. Furthermore since the polymer matrix (PVDF-g-HEMA) is more amorphous as compared to pristine PVDF, there is more charge accumulation at the amorphous/crystalline interface in the nanocomposites with increasing loading which results in higher dielectric properties The dielectric loss of PVDF-g-HEMA/BaTiO$_3$ composite is given in FIG. 3B. The dielectric loss increases with weight percentage of ceramic fillers. For the samples, with highest nanoparticle loading, the dielectric loss increased substantially, presumably due to imperfect filler packing, and agglomerization of the nanofiller.

Example 5

Electrical Properties of Core-shell Structured Dopamine-BaTiO$_3$/PVDF

Another cross-linking agent for core-shell structured ceramic-polymer nanocomposite via in situ synthesized has been investigated as well. The mechanism for in situ synthesis of core-shell structured dopamine-BaTiO$_3$/PVDF nanocomposite is shown in FIG. 4.

Figure 4A:
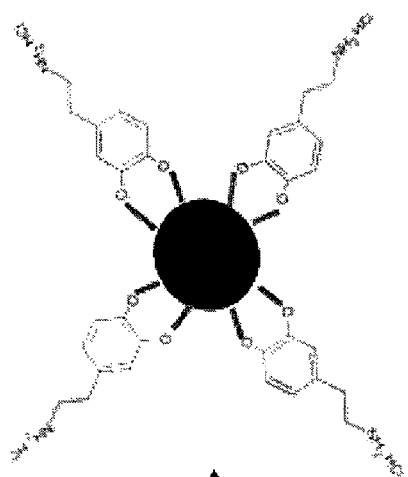
Figure 4B:
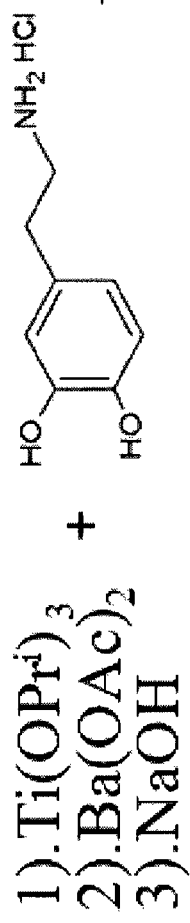
Figure 4B:
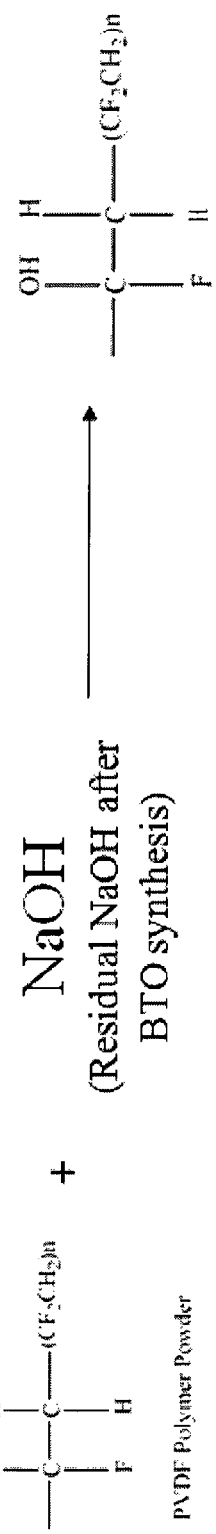

FIG. 4A to FIG. 4C depict a scheme for in situ polymerization of dopamine-BaTiO$_3$/PVDF, where FIG. 4A shows surface functionalization of BaTiO$_3$ nano-powders with dopamine; FIG. 4B shows dehydrofluorination with an alkaline solution; and FIG. 4C shows binding of dopamine-BaTiO$_3$ on PVDF nanoparticle surface.

In the experiments, barium titanate (BaTiO$_3$) nanostructures of sub-100 nm diameters were synthesized using refluxing method at 100° C. for 2 hrs. Dopamine was dissolved in Tris buffer. After that, the dopamine solution was added to the BaTiO$_3$ nanostructures suspension.

Refluxing was carried out at 100° C. for 2 hrs until the mixture changes into yellow color. Covalent bonding is formed between dopamine and BaTiO$_3$ nanostructures by refluxing method. The yellow color solution changes into brown color during refluxing.

The irradiated PVDF (250 mg) was suspended in a known amount of dopamine-BaTiO$_3$ solution in a flask for refluxing at 100° C. for about 2 hrs. After the reaction is completed, the in situ synthesized core-shell structured powder (Dopamine-BaTiO$_3$-PVDF) was washed with water for five times and collected using a centrifuge in order to remove the residual free surfactant. Washed powders were dried for 12 hrs at 100° C. on a hot plate.

Electrical properties of in situ synthesis of core-shell structured dopamine-BaTiO$_3$/PVDF nanocomposite are shown in FIG. 5 and FIG. 6.

Figure 5A:
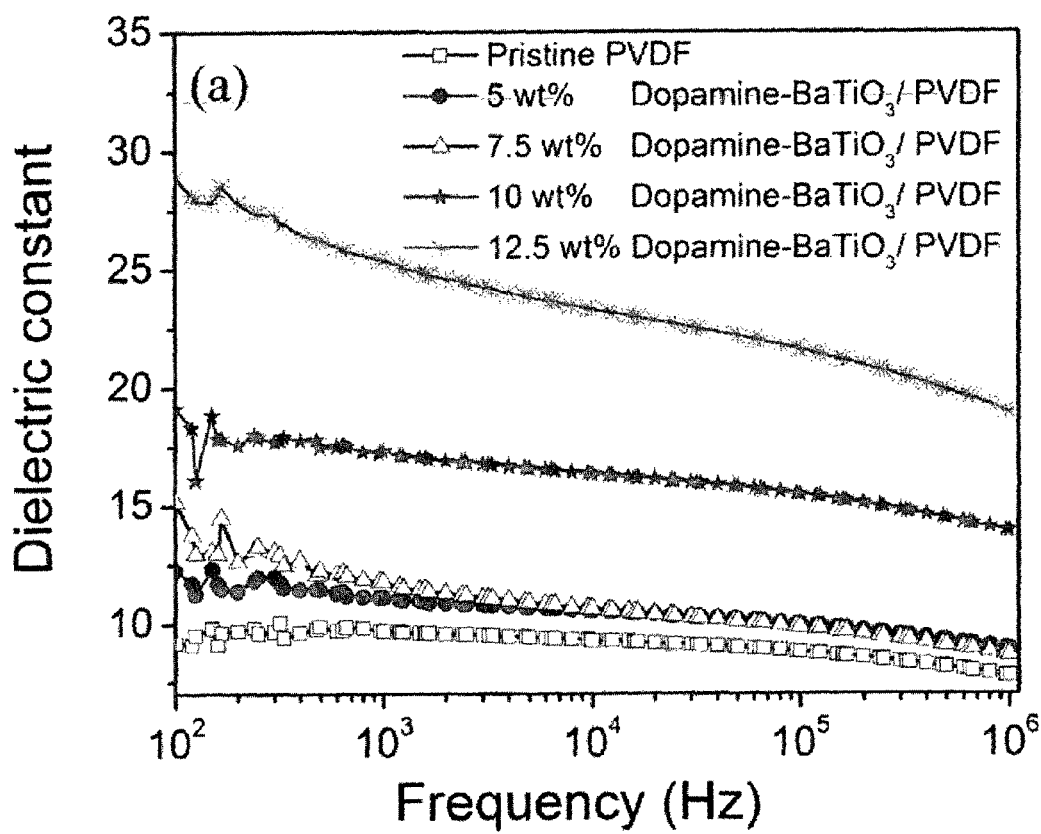
FIG. 5A is a graph showing dependences of dielectric constant of pristine PVDF and various weight percentage of dopamine-BaTiO$_3$/PVDF in situ synthesized composite on frequency measured at room temperature from $10^2$ to $10^6$ Hz.
Figure 5B:
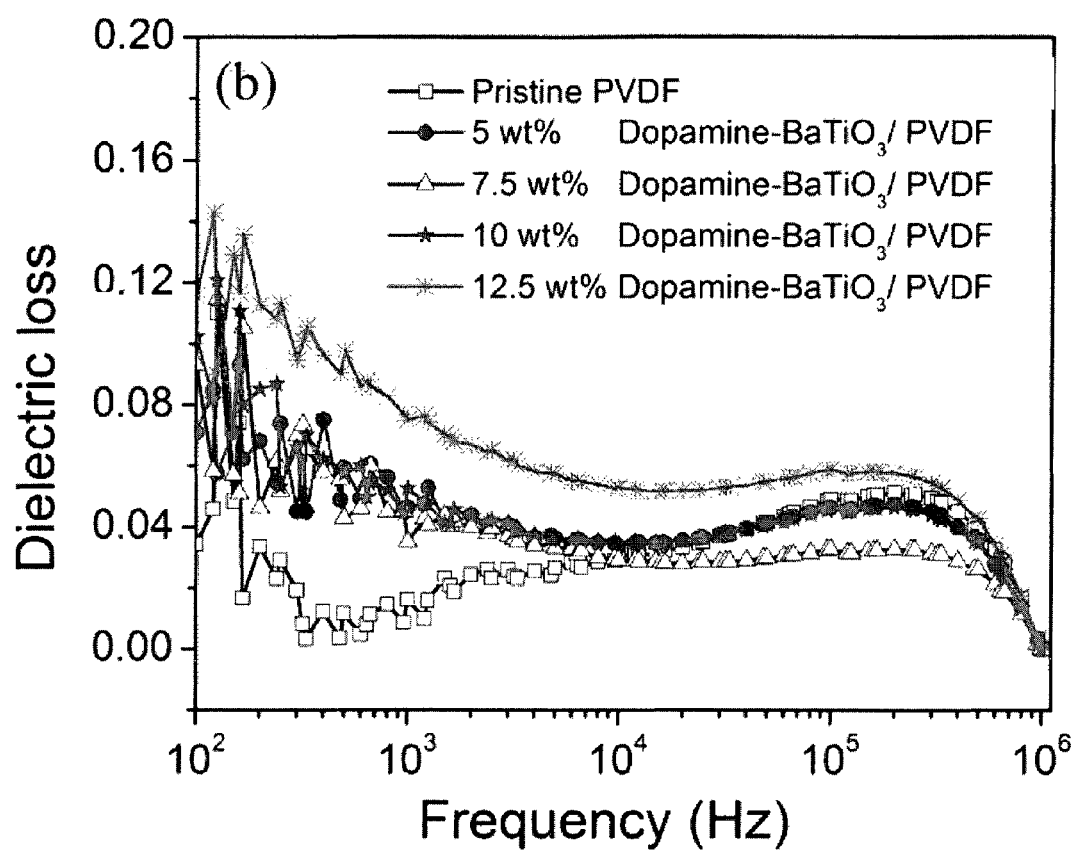
FIG. 5B is a graph showing dependences of dielectric loss of pristine PVDF and various weight percentage of dopamine-BaTiO$_3$/PVDF in situ synthesized composite on frequency measured at room temperature from $10^2$ to $10^6$ Hz.

For in situ:

The dielectric constant and loss with various weight percentage of nanoparticle in the nancomposite is plotted in FIG. 5A and FIG. 5B. The dielectric constant increases with increase-in-BaTiO$_3$ content. At 12.5 wt % content of the dopamine BaTiO$_3$ nanoparticle, PVDF based nanocomposite exhibits a dielectric constant of 29. Dielectric loss increases with increasing weight percentage of ceramic fillers.

The electrical energy density of dopamine-BaTiO$_3$/PVDF was measured by a modified Sawyer-Tower circuit. As summarized in FIG. 6B, the addition of BaTiO$_3$ nanostructures into the polymers greatly increases the energy density of the material. The electrical energy density dropped dramatically with further increase of the filler weight to 12.5 wt %.

Without wishing to be bound by theory, it is postulated that the suitable hydrophilic group on the polydopamine modified nanoparticle acts as a bridge-link between interfaces of BaTiO$_3$ nanostructures and polymer matrix. These links facilitate elimination of aggregate formation, followed by reduction in the concentration and mobility of ionizable hydroxyl groups on the nanostructures surface which ultimately minimizes the leakage paths, thereby translating to high dielectric properties. Furthermore, nanostructures in the nanocomposites act as a nucleating agent which increases degree of crystallinity of the amorphous polymer matrix. Such an improved crystallinity with increase in nanostructures loading offers a high polarizability which results in higher electrical properties.

Figure 6A:
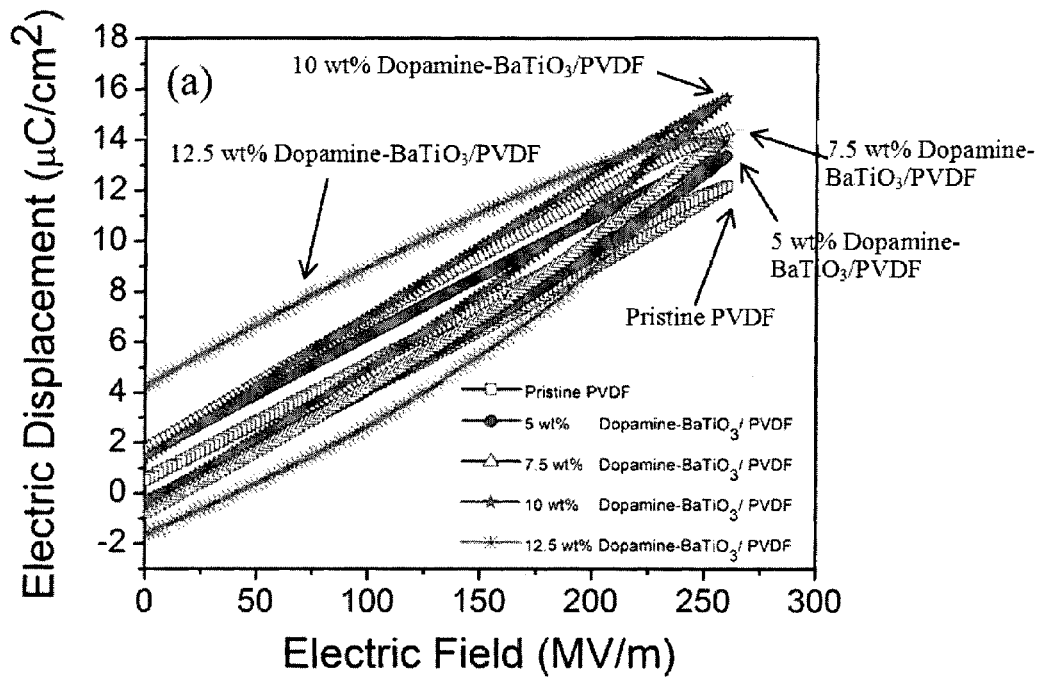
FIG. 6A is a graph showing electric displacement-field (D-E) loop measured under applied fields at 266 MV/m at room temperature.
Figure 6B:
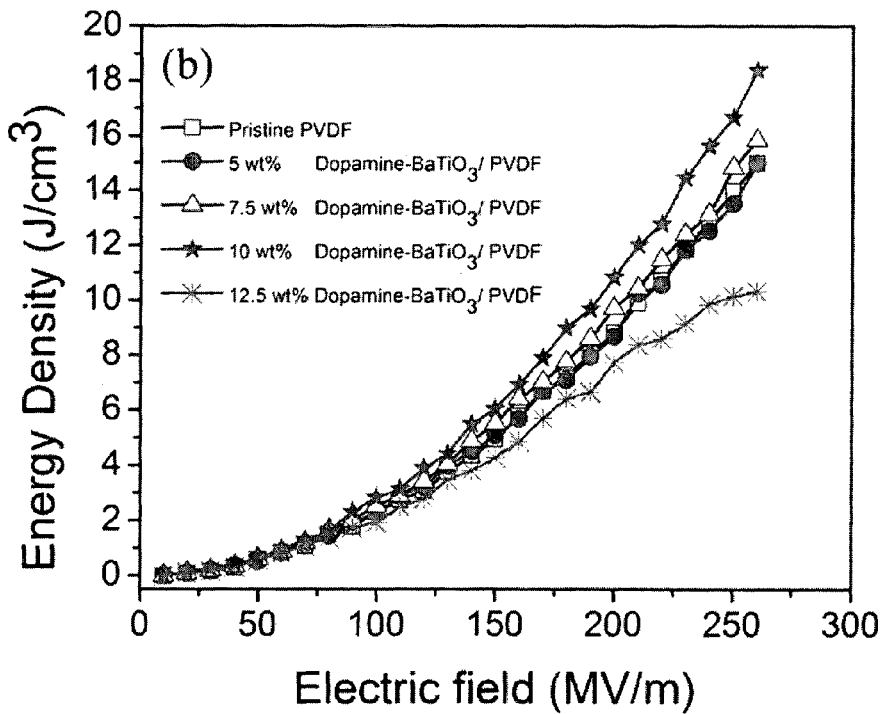
FIG. 6B is a graph showing dependence of energy density of dopamine-BaTiO$_3$/PVDF in situ synthesized composite measured under different applied field. As may be seen, energy density of in situ synthesis of core-shell structured dopamine-BaTiO$_3$/PVDF nanocomposite can be reached up to 18.38 J/cm$^3$.
Figure 7A:
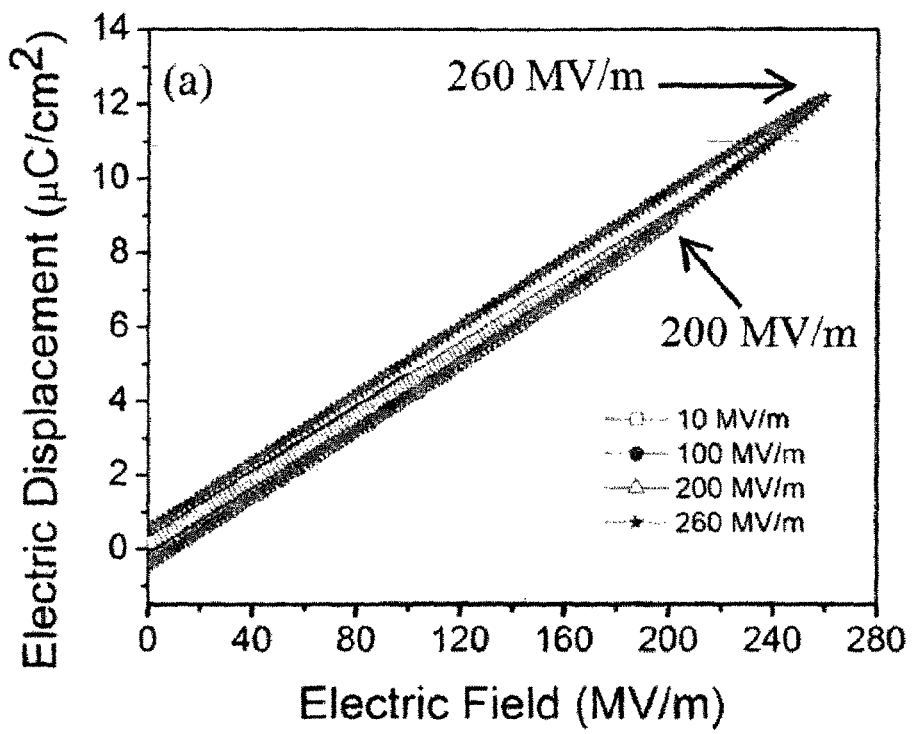
FIG. 7A is an electric displacement-field (D-E) loop measured under different applied fields at room temperature in silicon oil for pristine PVDF.
Figure 7B:
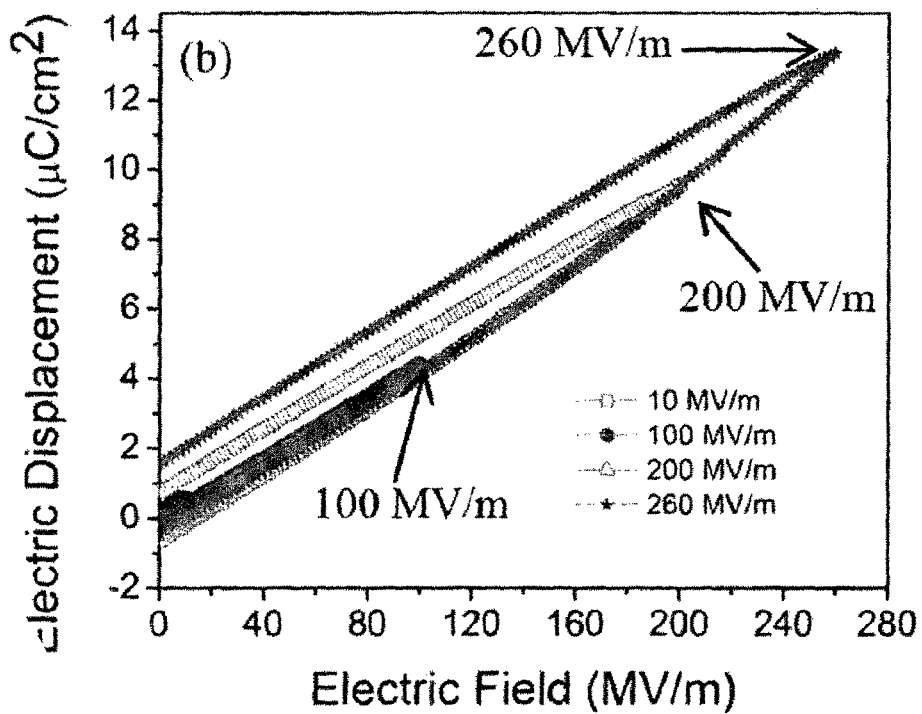
FIG. 7B is an electric displacement-field (D-E) loop measured under different applied fields at room temperature in silicon oil for 5 wt % in situ surface functionalized dopamine-BaTiO$_3$/PVDF.
Figure 7C:
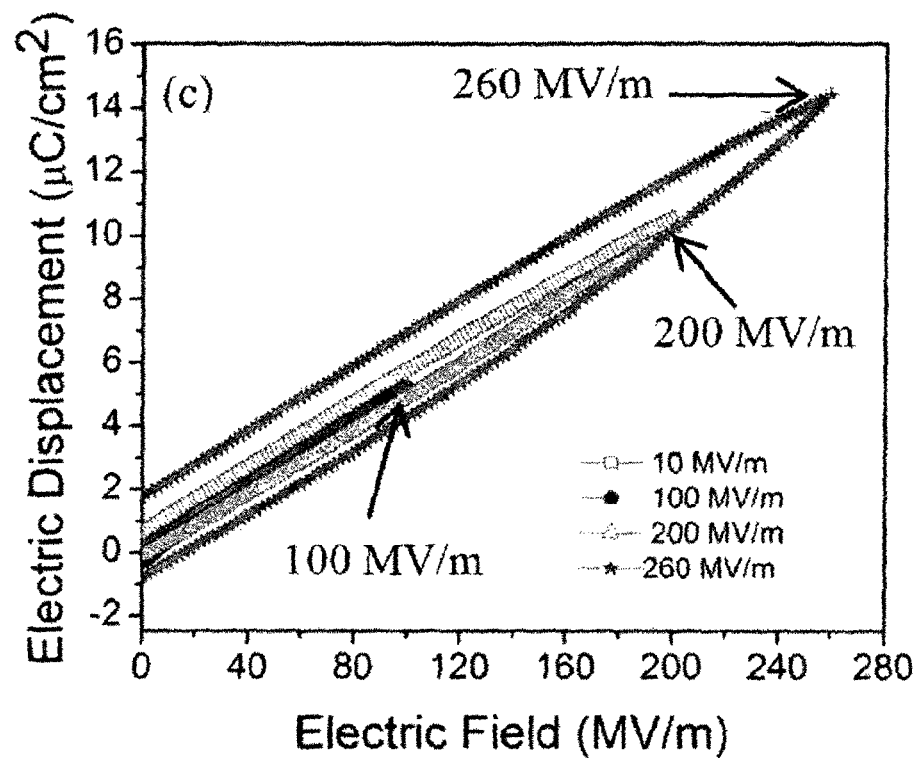
FIG. 7C is an electric displacement-field (D-E) loop measured under different applied fields at room temperature in silicon oil for 7.5 wt % in situ surface functionalized dopamine-BaTiO$_3$/PVDF.
Figure 7D:
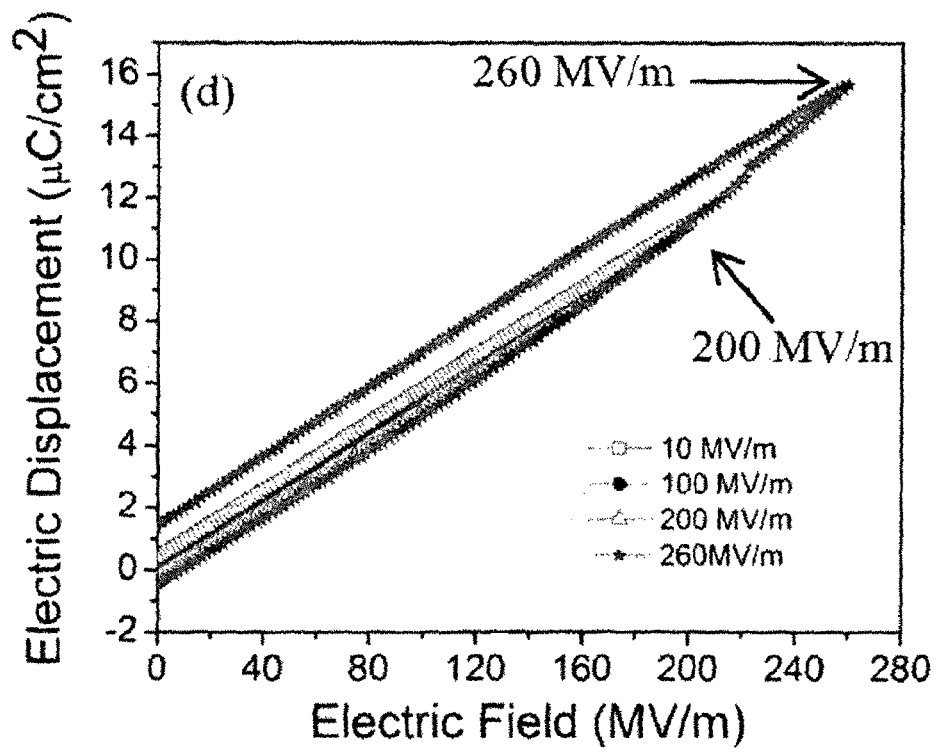
FIG. 7D is an electric displacement-field (D-E) loop measured under different applied fields at room temperature in silicon oil for 10 wt % in situ surface functionalized dopamine-BaTiO$_3$/PVDF.
Figure 7E:
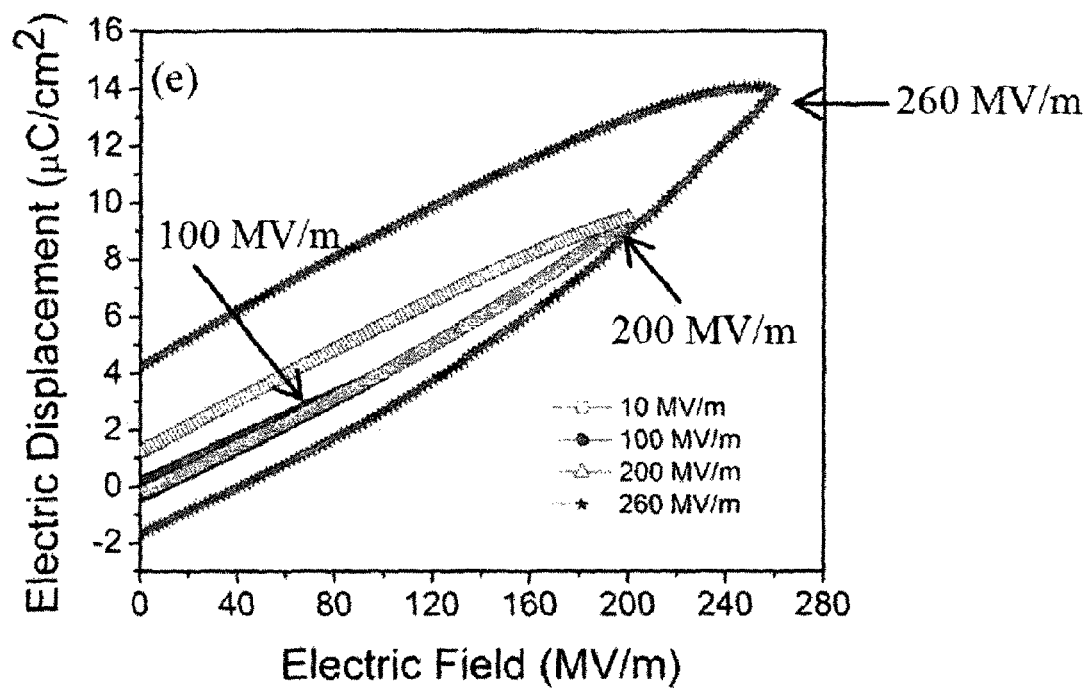
FIG. 7E is an electric displacement-field (D-E) loop measured under different applied fields at room temperature in silicon oil for 12.5 wt % in situ surface functionalized dopamine-BaTiO$_3$/PVDF.

FIG. 6A shows that electric displacement-field (D-E) loop measured for pristine PVDF and dopamine-BaTiO$_3$/PVDF nanocomposite with different weight percentages of BaTiO$_3$ under an applied field of 266 MV/m using modified Sawyer-Tower circuit. The electric displacement increased with increasing weight percentage of dopamine-BaTiO$_3$ nanostructures up to 10 wt %. The electric displacement reached more than 15 µC/cm$^2$ in the PVDF composite with 10 wt % dopamine-BaTiO$_3$ nanostructures. The electrical energy density dropped dramatically with further increase of the filler weight to 12.5 wt % due to higher dielectric loss as shown in FIG. 6A.

In the experiments carried out, a method of fabricate thin film by in situ synthesis core-shell structured powder is carried out as follows:

The core shell structured nanocomposite powders, which have been formed by in situ surface functionalization, were dissolved in organic solvent at room temperature. For example, N,N-dimethylformamide (DMF) solvent was used to make thin film. Other organic solvents that may be used include, but are not limited to, butanone (MEK) and/or acetone. The solution was stirred overnight. The thin film was drop-coated or tape-coated onto a clean _glass-slide and dried conductive electrodes-were sputtered on both sides of the samples for testing the electrical properties.

The BaTiO$_3$ nanostructures may form network connections in the film, and in doing so, reduce the breakdown voltage and increase the dielectric loss of the nanocomposite. This accounts for the high dielectric loss observed at 12.5 wt % dopamine-BaTiO$_3$/PVDF.

As demonstrated, energy density of nanocomposite reaches up to 18.38 J/cm$^3$ for 10 wt % dopamine-BaTiO$_3$/PVDF. Incorporation of the nanostructures notably raises the electric displacement, which accounts for remarkably improved energy densities in the nanocomposite over the pristine polymer as summarized in FIG. 6B. Compared to the pristine polymer matrix, the nanocomposites exhibit increased polarization hysteresis and dielectric loss which increase progressively with the applied field as shown in FIG. 7A to FIG. 7E. These results indicate strong charge injection and trapping in the composite because the BaTiO$_3$ nanostructures with a higher permittivity greatly enhance the local electric field dropped across the polymer phase.

It has been reported that the lower crystalline of the films with the same crystal phases led to a higher maximum and remnant polarization. In the present case, BaTiO$_3$ was synthesized by alkaline solution. Residual alkaline solution reacts with PVDF to form nanocomposite by in situ surface functionalization. Meanwhile, this process also breaks the PVDF crystals to form lower crystalline of PVDF which results in high polarization by increasing weight percentage of dopamine-BaTiO$_3$ nanostructures.

Example 6

Commercial Applications

The global market for relevant materials and technologies is provided below.

1. Capacitor: According to a technical market research report from BCC. The global market for capacitors, flywheels and SMES systems will rise at an average annual growth rate (AAGR) of 5.9%, from $9.1 billion in 2005 to $12.2 billion in 2010. Mature capacitor technologies that include aluminum, tantalum and ceramic capacitors account for 98.7% of all capacitor sales.

2. High performance films: According to a new technical market research report from BCC, the U.S. market for high-performance films is worth an estimated $11.3 billion in 2010, but is expected to increase to $13.5 billion in 2015, for a 5-year compound annual growth rate (CAGR) of 3.6%.

3. Utility power storage technologies: According to a technical market research report from BCC, the global market for electric energy storage (EES) systems will increase from $2.3 billion in 2007 to an estimated $2.6 billion by the end of 2008. It should reach $3.8 billion by 2013, a compound annual growth rate (CAGR) of 8.0%.

4. Power electronics: According to a technical market research report from BCC, the global market for power electronics was worth $9.8 billion in 2007. This is expected to reach $10.2 billion by the end of 2008 and $17.7 billion in 2013, for a compound annual growth rate (CAGR) of 11.7%.

5. Thick film devices, processes and applications: The global market for thick film devices is estimated to increase at a 13.2 % compound annual growth rate (CAGR) during the forecast period, yielding revenues increasing from $26.7 billion in 2009 to $49.8 billion by 2014. Energy devices are the largest market segment, worth $14.5 billion in 2009. This market is expected to reach $31.1 billion in 2014, a compound annual growth rate (CAGR) of 16.5%. Display devices are the fastest growing segment, increasing at a compound annual growth rate (CAGR) of 18.5%. This market was valued at $1.2 billion in 2009 and is expected to increase to $2.8 billion in 2014.

In summary, the core-shell structure of ceramic-polymer nanocomposite was successfully prepared by using different cross-linking agent via in situ synthesis method. PVDF-g-HEMA/BaTiO$_3$ and dopamine-BaTiO$_3$/PVDF core-shell structured nanocomposite powders have been prepared.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method for preparing a ceramic-polymer nanocomposite, the method comprising
    a) providing a polymer comprising radicals on a surface thereof;
    b) contacting the polymer with a functionalizing agent comprising an alkaline solution selected from the group consisting of alkali metal hydroxides, ammonium hydroxide, and mixtures thereof to form a functionalized polymer; and
    c) either
        (i) grafting a cross-linking agent onto the functionalized polymer to form a graft copolymer, and attaching ceramic nanostructures to the graft copolymer to form a ceramic-polymer nanocomposite, or
        (ii) grafting a cross-linking agent onto ceramic nanostructures to form modified ceramic nanostructures, and attaching the modified ceramic nanostructures to the functionalized polymer to form a ceramic-polymer nanocomposite.

2. The method according to claim 1, wherein the polymer comprises a fluoropolymer.

3. The method according to claim 1, wherein the polymer comprises a polymer or copolymer of tetrafluoroethylene, hexafluoropropylene, or vinylidene fluoride.

4. The method according to claim 1, wherein the polymer comprises a polymer or copolymer of vinylidene fluoride selected from the group consisting of polyvinylidene fluoride (PVDF), poly(vinylidenefluoride-co-trifluoroethylene) (PVDF-TrFE), poly(vinylidenefluoridehexafluoropropylene) (PVDF-HEP), poly(vinylidene fluoride chlorotrifluoroethylene) (PVDF-CTFE), vinylidene fluoride-trifluoroethylene-chlorofluoroethylene terpolymer (PVDF-TrFE-CFE), and mixtures thereof.

5. The method according to claim 1, wherein providing a polymer comprising radicals on a surface thereof comprises irradiating a polymer with radiation selected from the group consisting of ultraviolet light, plasma, X-rays, γ-rays, electron beam, ion beam, and combinations thereof.

6. The method according to claim 1, wherein providing a polymer comprising radicals on a surface thereof comprises irradiating a polymer with an electron beam.

7. The method according to claim 1, wherein the functionalizing agent comprises sodium hydroxide.

8. The method according to claim 1, wherein the functionalized polymer comprises an —OH group.

9. The method according to claim 1, wherein the cross-linking agent comprises a —OH group.

10. The method according to claim 1, wherein the cross-linking agent is selected from the group consisting of 2-hydroxymethyl methacrylate (HEMA), dopamine, and mixtures thereof.

11. The method according to claim 1, wherein the ceramic nanostructures are selected from the group consisting of barium titanyl oxalate, barium titanate, boron nitride, titanium nitride, silicon nitride, tantalum nitride, and mixtures thereof.

12. The method according to claim 1, wherein the ceramic nanostructures comprise barium titanate.

13. The method according to claim 1, wherein attaching the ceramic nanostructures to the graft copolymer comprises
 a) functionalizing the ceramic nanostructures with an —OH group, and
 b) chemically reacting the ceramic nanostructures with the graft copolymer to covalently attach the ceramic nanostructures to the graft copolymer.

14. The method according to claim 13, wherein chemically reacting the ceramic nanostructures with the graft copolymer is carried out at a temperature in the range of about 80° C. to about 150° C.

15. The method according to claim 1, wherein attaching the modified ceramic nanostructures to the functionalized polymer comprises chemically reacting the modified ceramic nanostructures with the functionalized polymer to covalently attach the modified ceramic nanostructures to the functionalized polymer.

16. The method according to claim 15, wherein chemically reacting the modified ceramic nanostructures with the functionalized polymer is carried out at a temperature in the range of about 80° C. to about 150° C.

17. The method according to claim 1, wherein c) is carried out in a reflux condenser.

18. A ceramic-polymer nanocomposite prepared by a method comprising
 a) providing a polymer comprising radicals on a surface thereof;
 b) contacting the polymer with a functionalizing agent comprising an alkaline solution selected from the group consisting of alkali metal hydroxides, ammonium hydroxide, and mixtures thereof to form a functionalized polymer; and
 c) either
  (i) grafting a cross-linking agent onto the functionalized polymer to form a graft copolymer, and attaching ceramic nanostructures to the graft copolymer to form a ceramic-polymer nanocomposite, or
  (ii) grafting a cross-linking agent onto ceramic nanostructures to form modified ceramic nanostructures, and attaching the modified ceramic nanostructures to the functionalized polymer to form a ceramic-polymer nanocomposite.

* * * * *